US009448696B1

(12) United States Patent
Kline

(10) Patent No.: US 9,448,696 B1
(45) Date of Patent: *Sep. 20, 2016

(54) SYSTEM AND METHOD FOR MEDIA CONTENT COLLABORATION THROUGHOUT A MEDIA PRODUCTION PROCESS

(71) Applicant: DAX PFT, LLC, Hollywood, CA (US)

(72) Inventor: Joshua C. Kline, Los Angeles, CA (US)

(73) Assignee: Dax PFT, LLC, Hollywood, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 13/903,908

(22) Filed: May 28, 2013

Related U.S. Application Data

(63) Continuation of application No. 12/976,929, filed on Dec. 22, 2010, now Pat. No. 9,215,514, which is a continuation of application No. 12/686,316, filed on Jan. 12, 2010, now Pat. No. 8,218,764, which is a continuation of application No. 11/033,041, filed on Jan. 11, 2005, now Pat. No. 7,660,416.

(51) Int. Cl.
G06F 3/00 (2006.01)
G06F 3/0484 (2013.01)
(Continued)

(52) U.S. Cl.
CPC ............. *G06F 3/0484* (2013.01); *G06Q 10/10* (2013.01); *G11B 27/034* (2013.01);
(Continued)

(58) Field of Classification Search
CPC .. G06Q 10/10; G11B 27/034; G11B 27/322; H04N 7/173; H04N 21/4788; H04N 21/854; H04N 21/6125; G06F 3/0484
See application file for complete search history.

(56) References Cited

U.S. PATENT DOCUMENTS 5,365,579 A 11/1994 Hendrickson
5,671,428 A 9/1997 Muranaga et al.
(Continued)

FOREIGN PATENT DOCUMENTS

WO 0150668 A2 7/2001
WO 0152526 A1 7/2001

OTHER PUBLICATIONS

Ochiva, Dan; Fields & Frames; Digital Content Producer.com; Jun. 1, 2002, 12:00 PM.
(Continued)

Primary Examiner — Kieu Vu
Assistant Examiner — Asteway T Gattew
(74) Attorney, Agent, or Firm — Seed IP Law Group PLLC

(57) ABSTRACT

A method for delivering media content in full motion video to users via a network in a collaborative media production process is disclosed. The method includes: receiving production digital media files at a server; preparing the production digital media files for downloading or streaming to a collaborative display interface, wherein the production digital media files include meta-data captured on a production set, including production time codes; downloading or streaming the production digital media files to a collaborative display interface via the network; and enabling viewing and collaborative interaction with the production digital media files by a user using the collaborative display interface, wherein the collaborative interaction includes interacting with other users during post-production by notating comments that include inserting a link to a specific digital media file and an actual media clip frame using a production time code.

32 Claims, 20 Drawing Sheets

(51) Int. Cl.

| | |
|---|---|
| G06Q 10/10 | (2012.01) |
| G11B 27/034 | (2006.01) |
| G11B 27/32 | (2006.01) |
| H04N 7/173 | (2011.01) |
| H04N 21/4788 | (2011.01) |
| H04N 21/854 | (2011.01) |
| H04N 21/61 | (2011.01) |

(52) U.S. Cl.
CPC ............ *G11B 27/322* (2013.01); *H04N 7/173* (2013.01); *H04N 21/4788* (2013.01); *H04N 21/6125* (2013.01); *H04N 21/854* (2013.01)

(56) References Cited

U.S. PATENT DOCUMENTS

| | | | |
|---|---|---|---|
| 6,366,914 B1 | 4/2002 | Stern | |
| 6,445,777 B1 | 9/2002 | Clark | |
| 6,466,655 B1 | 10/2002 | Clark | |
| 6,598,074 B1 | 7/2003 | Moller et al. | |
| 6,654,757 B1 | 11/2003 | Stern | |
| 6,789,109 B2 | 9/2004 | Samra et al. | |
| 6,957,186 B1 | 10/2005 | Guheen et al. | |
| 7,013,290 B2 | 3/2006 | Ananian | |
| 7,043,477 B2 * | 5/2006 | Mercer | G11B 19/025 |
| 7,143,357 B1 | 11/2006 | Snibbe et al. | |
| 2001/0040592 A1 | 11/2001 | Foreman et al. | |
| 2001/0052001 A1 | 12/2001 | Stern | |
| 2002/0015050 A1 | 2/2002 | Kawai et al. | |
| 2002/0026256 A1 | 2/2002 | Hilton | |
| 2003/0004968 A1 * | 1/2003 | Romer | G06F 17/30253 |
| 2003/0033325 A1 | 2/2003 | Boogaard | |
| 2003/0090711 A1 | 5/2003 | Yoshi et al. | |
| 2003/0146915 A1 | 8/2003 | Brook et al. | |
| 2003/0208459 A1 | 11/2003 | Stern | |
| 2003/0225641 A1 | 12/2003 | Gritzmacher et al. | |
| 2004/0004665 A1 | 1/2004 | Kashiwa | |
| 2004/0015427 A1 | 1/2004 | Comelio | |
| 2004/0071441 A1 | 4/2004 | Foreman et al. | |
| 2004/0098754 A1 * | 5/2004 | Vella | H04N 5/445 725/135 |
| 2004/0133919 A1 | 7/2004 | Incentis | |
| 2004/0139474 A1 | 7/2004 | Carro | |
| 2004/0199578 A1 | 10/2004 | Kapczynski et al. | |
| 2004/0261027 A1 | 12/2004 | Dillon et al. | |
| 2005/0108361 A1 * | 5/2005 | Scott | H04L 63/08 709/217 |
| 2005/0234958 A1 | 10/2005 | Sipusic et al. | |

OTHER PUBLICATIONS (Unknown editor); Microsoft and Sample Digital Announce First Major Motion Picture Produced Using Windows Media; DMN Newswire; May 22, 2002.

* cited by examiner

| Movie | | | | | | | |
|---|---|---|---|---|---|---|---|
| | Today's Date: 03 February 2003 | | Project | Add Clip | Admin | Home | Logout |
| Automatic | Manual | Multiple | Additional | | | | |

Account [Movie ▷]
Title
Description
Shoot Date [02/03/2003]
Start Time
Duration
Frame Rate ⦿ 23.90 ○ 24 ○ 25 ○ 29.97 ○ 30 ○ Other
Scene
Camera
Shot
Take
High Bitrate Media [Browse] [Preview]
Low Bitrate Media [Browse] [Preview]
Call Sheet [Browse]
[Submit]

☐ View Full Screen

| Movie | | | | | | |
|---|---|---|---|---|---|---|
| | Today's Date: 03 February 2003 | Project | Add Clip | Admin | Home | Logout |

Accounts | Groups

Account Administration
☆ Add Existing User ☆

☐ System Account
☐ Suvi Information System Pvt. Ltd
☐ Movie 1
☐ Movie 2
☐ Movie 3
☐ Movie 4
☐ Movie 5
☐ Movie 6
☐ Movie 7
☐ Movie 8
☐ Movie 9
☐ Movie 10

User Administration
Movie Users

☆ Add New User ☆
☆ Add Existing User ☆

☐ User 1
☐ User 2
☐ User 3
☐ User 4
☐ User 5
☐ User 6
☐ User 7
☐ User 8
☐ User 9
☐ User 10
☐ User 11

Name — Movie
Description — Short Film
Account Type — Feature Film
Director — Director Name
Director URL
Copyright — Owner Name
Rating — Not Yet Rated
License Rights — Unlimited play
V2RegPage — licensechallenge.aspx Edit No user selected

FIG. 17

Movie | Today's Date: 03 February 2003 | Project | Add Clip | Admin | Home | Logout

Accounts | Groups

Account Administration
- ☆ Add Existing User ☆
- ☐ System Account
- ☐ Suvi Information System Pvt. Ltd
- ☐ Movie 1
- ☐ Movie 2
- ☐ Movie 3
- ☐ Movie 4
- ☐ Movie 5
- ☐ Movie 6
- ☐ Movie 7
- ☐ Movie 8
- ☐ Movie 9
- ☐ Movie 10

User Administration
Movie
- ☆ Add New User ☆
- ☆ Add Existing User ☆

- ☐ User 1
- ☐ User 2
- ☐ User 3
- ☐ User 4
- ☐ User 5
- ☐ User 6
- ☐ User 7
- ☐ User 8
- ☐ User 9
- ☐ User 10
- ☐ User 11

Name: [Movie]
Description: [Short Film]
Account Type: [Feature Film ▽]
Director: [Director Name]
Director URL:
Copyright: [Owner Name]
Rating: [Not Yet Rated ▽]
License Rights: [Unlimited play ▽]
V2RegPage: [licensechallenge.aspx]

[Cancel] [Save Account]

No user selected

FIG. 18

Movie | Today's Date: 03 February 2003 | Project | Add Clip | Admin | Home | Logout Accounts | Groups

Account Administration
☆ Add Existing User ☆
- ☐ System Account
- ☐ Suvi Information System Pvt. Ltd
- ☐ Movie 1
- ☐ Movie 2
- ☐ Movie 3
- ☐ Movie 4
- ☐ Movie 5
- ☐ Movie 6
- ☐ Movie 7
- ☐ Movie 8
- ☐ Movie 9
- ☐ Movie 10

User Administration
The Road To Las Vegas Users
 ☆ Add New User ☆
 ☆ Add Existing User ☆

- ☐ User 1
- ☐ User 2
- ☐ User 3
- ☐ User 4
- ☐ User 5
- ☐ User 6
- ☐ User 7
- ☐ User 8
- ☐ User 9
- ☐ User 10
- ☐ User 11

User 3

First Name: User 3
Middle Name:
Last Name: User 3
Email: user3@address.com
Logon Name: User 3
Account Role: User ✎ Edit

SYSTEM AND METHOD FOR MEDIA CONTENT COLLABORATION THROUGHOUT A MEDIA PRODUCTION PROCESS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

This application is a continuation of U.S. patent application Ser. No. 12/976,929, filed Dec. 22, 2010, which is a continuation of U.S. patent application Ser. No. 12/686,316, filed Jan. 12, 2010, now U.S. Pat. No. 8,218,764, issued Jul. 10, 2012, which is a continuation of U.S. patent application Ser. No. 11/033,041, filed Jan. 11, 2005, now U.S. Pat. No. 7,660,416, issued Feb. 9, 2010, all of which are incorporated herein by reference.

FIELD

This disclosure relates generally to a system and method for delivering media content to users and, more particularly, to a system and method for delivering media content to users via a network in a collaborative application.

BACKGROUND

In the arena of feature film, television, and commercial production/post-production, film has been the traditional form of media in which this type of content is shot. After being shot, the content is typically edited in post-production. Before film can be edited digitally, the film is first transferred to videotape (or directly to a digital format) in a process known as telecine. The telecine process has been used for a significant period of time, since film is viewed more often as video than as projected in a theater. Even currently, while video technology is so widely available, the vast majority of television programming that is not live is actually recorded originally on film and then transferred to video by telecine equipment.

The telecine process is the first step in post-production. Notably, an original camera negative has coding written on the edge of the film when the film is manufactured. These edge numbers are used to uniquely identify each frame of film. This information is referred to as meta-data. Videotape has time code that serves the same purpose of uniquely identifying each frame of video on a tape. When film is transferred to video, a relationship is established between the edge code of the film and the time code of the video.

Telecine equipment is computer controlled. The correlation between film edge codes and video time codes is stored in the computer database during the telecine process. At the end of a telecine session, this information is made available to other computers for use in further activities such as digitizing video and creating cut lists for conforming the film negative.

A standard method for communicating this information from the telecine equipment to other computers is through a text file called a Flex file, which is a telecine log file. At the end of the session, the telecine computer writes the database information to a telecine log file (e.g., a Flex file). Often this telecine log file is copied to a transportable memory storage device and delivered to the respective client. In addition to the edge code-time code relationship, a telecine log file may also contain other information such as the "slate" (i.e., the scene numbers, take numbers, and letters, which are assigned during production to identify each shot) and the sound time code. A telecine log file may also contain notes and comments entered by the operator during the telecine session.

The three most popular formats of telecine log files, in no particular order, are "FLX" files from TLC, "FTL" files from Evertz, and "ATN" files from Aaton. Referring to a Flex file, FLX (Film Log EDL Exchange) Protocol is intended to permit the automated communication of information between the telecine bay and "off-and on-line" editing systems. As discussed above, this information consists of a database relating all original film reel, positional, and KEYKODE™ data of transferred "elements" (scenes and takes) to the corresponding destination videotape reel and time code. The recorded tapes created during the telecine process become playback tapes during the video off-line process, during which a conventional EDL (edit decision list) is created that represents (via videotape reel designations and time codes) finished content. Additionally, "trace" software can then examine each edit decision in the EDL, find the corresponding film material in the FLX database, and produce a film conform list ("negative cutters list") as output. FLX also supports list-driven, field-accurate, and varispeed automated editing in the telecine bay. Further, it can be used to facilitate conforming film material for release in multiple video standards or to generate multiple tape masters in various formats simultaneously.

Another popular format of A/V (Audio/Video) log file is the Avid Log Exchange file ("ALE") from Avid. An ALE file is a more generic A/V log file and not strictly speaking a telecine log file, but an ALE file can contain the same kinds of information. AvidLogExchange is the application that converts film to tape transfer logs as well as 24P down conversions. The ALE format is the format of the ASCII (text file) that can be imported into Avid editing systems.

Thus, when the filming process begins, meta-data is captured electronically on the set as the film is being shot. After the film is shot, it is taken to a processing facility (lab), which makes a telecine transfer from the film footage into video footage. The video output of the telecine transfer can be to video tape (VCR), and/or a digital format (DVD and/or a digital file). Usually, a master is made directly from the telecine, and then several duplicates are made from there, typically of a lower resolution. These typically include VCR, DVD, and an AV log file (e.g., FLX file or ALE file), which contains the meta-data that was captured on the set. Specifically, the output from the telecine includes a high bit-rate file (media file), a low bit-rate file (media file), and the FLX file (text file).

At this stage of the post-production process there is a need for a fast and efficient system and method for delivering this daily media content to various personnel involved with the project. Traditionally, videotapes and/or DVDs of this media content (which is produced daily, and thus, often referred to as "Dailies") are couriered to these personnel. This is a costly process that can also be very slow depending on the distances over which the media content must be transferred. Furthermore, each person receiving the media content was typically isolated from the other personnel, making any type of joint interactive efforts very difficult, if not impossible, to achieve.

Accordingly, there is a continuing need for a system and method for delivering daily media content to various personnel in disparate locations. Further, there is a continuing need for enabling these personnel to jointly interact regarding this media content. Accordingly, those skilled in the art have long recognized the need for a delivery and display system that addresses these issues.

SUMMARY

Briefly, and in general terms, a method for delivering media content in full motion video to users via a network in a collaborative media production process is disclosed. The method includes: receiving production digital media files at a server; preparing the production digital media files for downloading or streaming to a collaborative display interface, wherein the production digital media files include meta-data captured on a production set, including production time codes; downloading or streaming the production digital media files to a collaborative display interface via the network; and enabling viewing and collaborative interaction with the production digital media files by a user using the collaborative display interface, wherein the collaborative interaction includes interacting with other users during post-production by notating comments that include inserting a link to a specific digital media file and an actual media clip frame using a production time code.

In some embodiments, another method for delivering media content in full motion video to users via a network in a collaborative media production process is disclosed. The method includes: receiving production digital media files at a server; preparing the production digital media files for downloading or streaming to a collaborative display interface, wherein the meta-data file contains meta-data at least from film, video, television, or commercial production or post-production, and wherein the meta-data includes SMPTE time codes; downloading or streaming the production digital media files to a collaborative display interface via the network; and enabling viewing and collaborative interaction with the production digital media files by a user using the collaborative display interface, wherein the collaborative interaction includes interacting with other users during production and post-production by notating comments that include inserting a link to a specific digital media file and an actual media clip frame.

In another embodiment, a collaborative display interface for a delivery and display system is disclosed, which prepares and delivers media content to users via a network. The collaborative display interface displays downloaded or streaming production digital media files to a user as media clips, wherein the media files are associated with meta-data that was captured on a production set. The collaborative display interface enables users to collaboratively interact with other users by notating comments that are linked to a specific production digital media file, and wherein the collaborative display interface includes a media mark-up overlay feature that enables notation of comments or drawing over an area on a media clip frame by a user. Additionally, the collaborative interaction includes interacting with other users during production and/or post-production by notating comments and linking the comments to a specific digital media file.

In still another embodiment, a collaborative display interface for a delivery and display system is disclosed, which prepares and delivers media content to users via a network. The collaborative display interface displays downloaded or streaming production digital media files to a user as media clips, wherein the media files are associated with meta-data at least from film, video, television, or commercial production or post production, and wherein the meta-data includes production time codes. Additionally, the collaborative display interface enables users to collaboratively interact with other users by notating comments that are linked to a specific production digital media file, wherein time marker links are related to production time codes and are attachable by a user to messages.

In yet another embodiment, a collaborative display interface for a delivery and display system is disclosed, which prepares and delivers media content to users via a network. The collaborative display interface displays downloaded or streaming production workflow digital media files to a user as media clips, wherein the media files are associated with meta-data that was captured on a production set including production time codes. Additionally, the collaborative display interface enables users to collaboratively interact with other users by notating comments that are linked to a specific production digital media file, wherein time marker links are related to time codes and are attachable by a user to messages, and wherein the time marker links enable messages to be associated with an exact frame.

Other features and advantages of the disclosure will become apparent from the following detailed description, taken in conjunction with the accompanying drawings, which illustrate by way of example, the features of the disclosure.

BRIEF DESCRIPTION OF THE DRAWINGS

FIG. 7 illustrates a front view of a Play List creation window in a collaborative display interface of the collaborative delivery and display system;

FIG. 13 illustrates a Manual File Upload option for uploading a media file;

FIG. 14 illustrates a Multiple File Upload option for uploading media files;

FIG. 16 illustrates an Account Administration window;

FIG. 17 illustrates a User Administration window;

FIG. 18 illustrates a User Administration window in which an "Add New Account" icon button is being selected to create a new account;

DETAILED DESCRIPTION OF THE EMBODIMENTS

Figure 1:
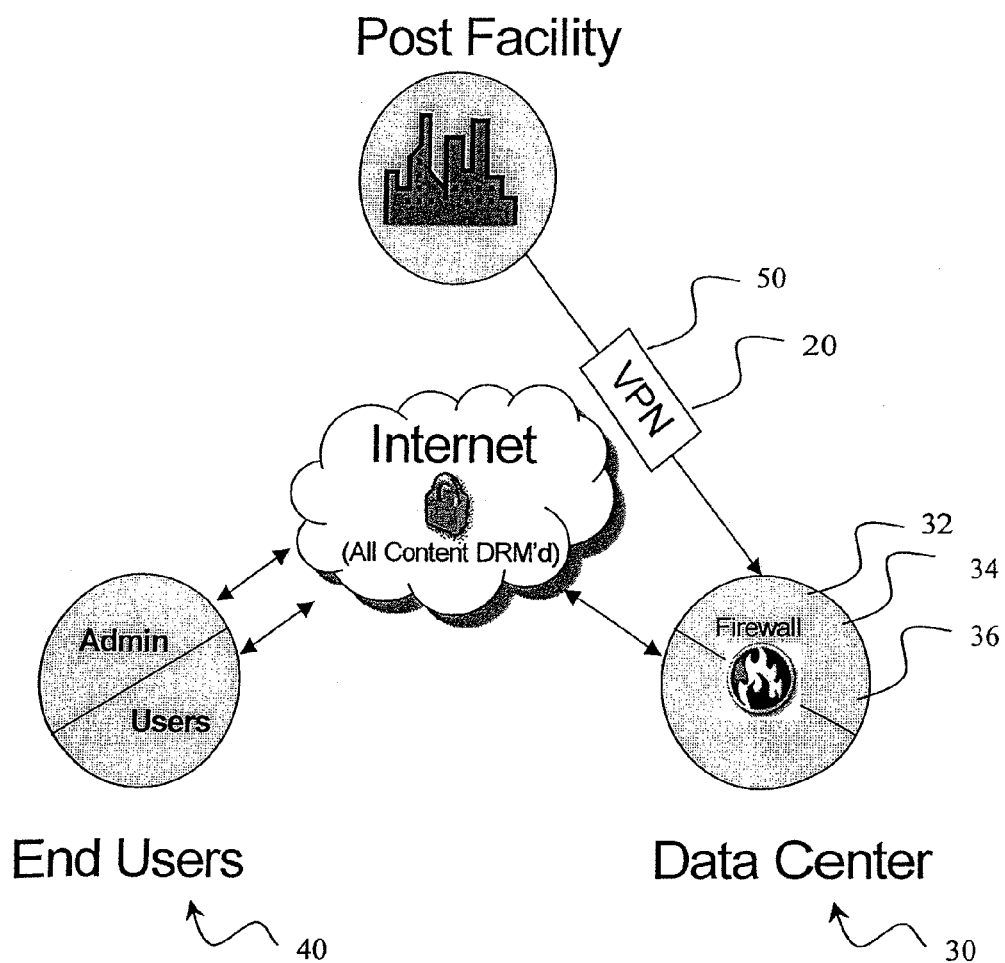
FIG. 1 illustrates a location diagram of a collaborative delivery and display system showing a post-processing facility, a data center, and an administrator/end user location, as well as a system server, parsing and embedding software, and an encryption system, as well as digital media files and AV log files.

An embodiment of the collaborative delivery and display system enables professionals in film, television, and commercial production, to function free from the constraints of time and location typically associated with daily film rushes and/or film cuts while in a secure and structured environment. In this manner, the collaborative delivery and display system prepares and enables delivery of daily film rushes and/or film cuts in full screen, full motion video to individuals working in feature film, television, and commercial production/post-production via the Internet. Referring now to the drawings, wherein like reference numerals denote like or corresponding parts throughout the drawings, and more particularly to FIGS. 1-11, there is shown a collaborative delivery and display system 10.

As shown in FIG. 1, an embodiment of the collaborative delivery and display system 10 is used to prepare daily film rushes and/or film cuts, and includes three different site locations which each includes various resources. These include a post-processing facility 20, a data center 30, and the administrator/end user location 40. However, in other embodiments, a smaller or larger number of locations may be utilized depending on the resources available. Referring to FIG. 1, at the post-processing facility 20, an encoding computer is routed to a slave duplication deck. The digital media 50 is encoded in real-time and in multiple bit-rates (e.g., a high bit rate file of 1500 Kbps, and a low bit rate file of 500 Kbps). In other embodiments, the digital media 50 is encoded in other bit-rates as well. Additionally, an AV log file 60, (e.g., a .FLX file) is attached to encoded content 50 (i.e., digital media) and uploaded to a data center server 32 to a project specific account.

At the data center 30, digital media files 50 and the AV (audio/video) log file 60 arrive at the server 32 where they are parsed. The parsing and embedding software 34 reads the meta-data from the AV log file 60, which can be either an .FLX AV log file or an .ALE edit log file, and chops the content into its appropriate segments (e.g., by scene number, take, or the like). FLX files (Film Log EDL Exchange) and ALE files (Avid Log Exchange) are text-based, meta-data files that describe specific details relating to Audio/Video files used in post-production. The segmenting is dependent on the manner in which the AV log file 60 is created during the telecine process.

Technically, in one embodiment, the original digital media files 50 are not chopped into segments, but rather copies of the digital media files 50 are segmented. This process includes copying portions of original digital media files 50 into new appropriated "segmented" digital media files, in accordance with the parameters defined by the meta-data (as opposed to chopping the original digital media files 50 into segments). Correspondingly, when film "cuts" (i.e., rough edits) are processed, there is no associated AV log file, so the meta-data is typically input by a user manually.

Figure 2:
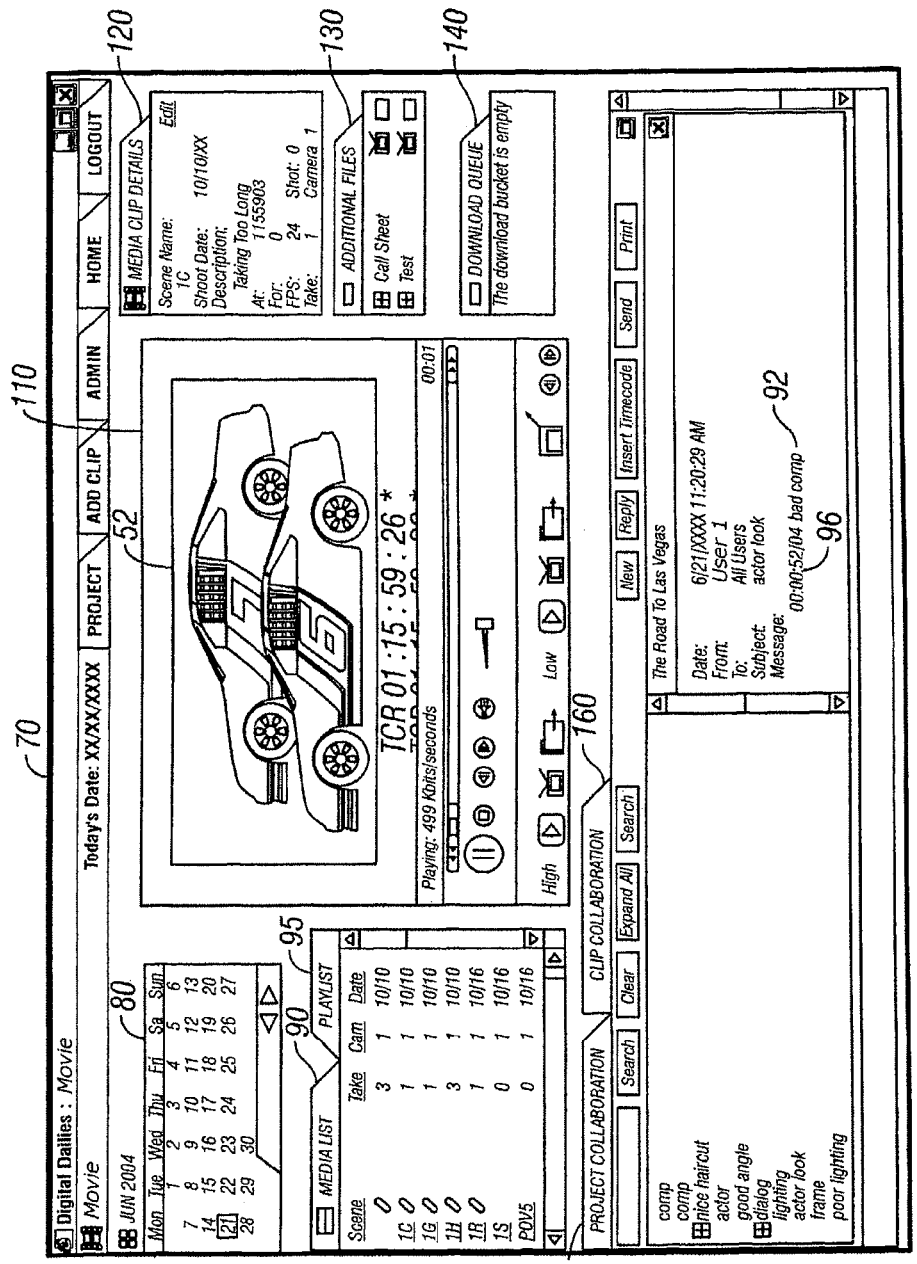
FIG. 2 illustrates a front view of a collaborative display interface of the collaborative delivery and display system.

Once this process is completed, the digital media files 50 are secured with an encryption system 36 using DIGITAL RIGHTS MANAGEMENT encryption. The digital media files 50 are then loaded into a project account where they are available for viewing as media clips 52, as shown in FIG. 2.

Referring again to FIG. 1, at the administrator/end user location 40, administrators create a set of permission rules for each end user (e.g., password and/or specific IP address). These permission rules may also include a hierarchical set of permission rules that determine the order and time frames in which each end user can view the media clips 52 and/or collaborate with respect to the media clips. This hierarchical set of permission rules is referred to as MAC (Media Access Control). Referring again to FIG. 2, an end user logs in via a collaborative display interface 70 in a web browser and selects media files 50 for viewing as a media clip 52. The media files 50 that are available for viewing are presented in a variety of organizational formats. Included in these organizational formats are Calendar 80 and Media List 90 functionality. Specifically, the user enters the collaborative display interface 70 and selects digital media files 50 to watch via Calendar 80 (where available media files 50 are categorized by the day on which there were filmed) and/or Media List 90 (where available media files 50 are listed by one of several criteria).

Figure 3:
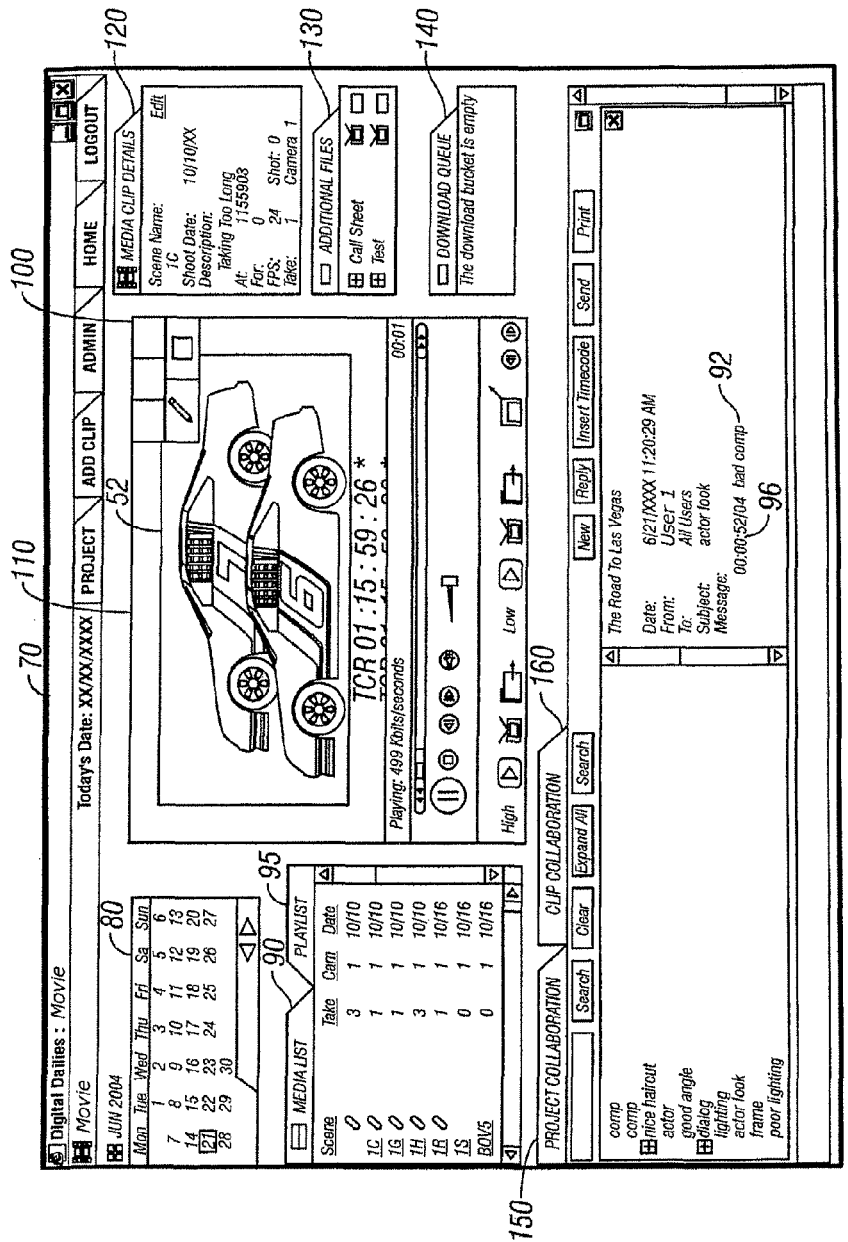
FIG. 3 illustrates a front view of the Media Mark-Up feature being used in a collaborative display interface of the collaborative delivery and display system.

Additionally, in the collaborative display interface 70, the user can view the media clips 52 in multiple bit-rates. The user can also engage in collaborative activities including, by way of example only, and not by way of limitation, entering comments 92 with time marker links 96, which are marked by a time-specific reference code, and forwarding the comments to either all users or specific users. Further, as shown in FIG. 3, the collaborative display interface 70 includes a media mark-up overlay feature 100 that enables a user to notate and/or "mark-up" a media clip frame in an embedded media player 110.

Figure 4:
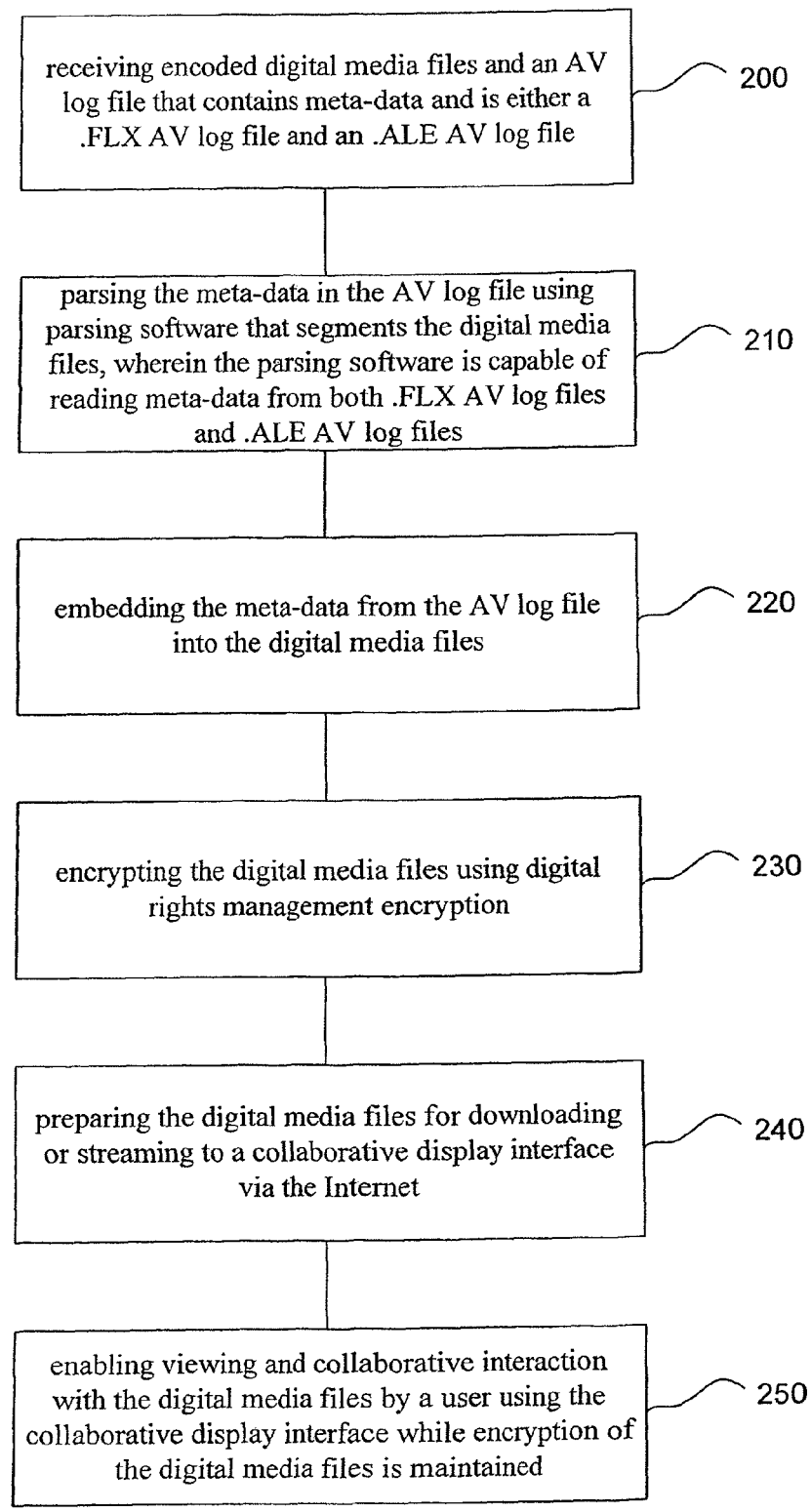
FIG. 4 illustrates a relational flow diagram of an embodiment of a collaborative delivery and display method.

Referring now to FIG. 4, a method includes, in step 200, receiving encoded digital media files 50 and an AV log file 60 that contains meta-data that is either a .FLX AV log file or an .ALE AV log file. Next, in step 210, the method includes parsing the meta-data in the AV log file 60 using parsing and embedding software 34 that segments the digital media files 50, wherein the parsing and embedding software is capable of reading meta-data from both .FLX AV log files and .ALE AV log files. In step 220, the method includes embedding the meta-data from the AV log file 60 into the segmented digital media files 50. Next, in step 230, the method includes encrypting the digital media files 50 using DIGITAL RIGHTS MANAGEMENT encryption. Continuing, in step 240, the method includes preparing the digital media files 50 for downloading or streaming to a collaborative display interface 70 via the Internet. Finally, in step 250, the method includes enabling viewing and collaborative interaction with the digital media files by a user using the collaborative display interface while encryption of the digital media files is maintained.

Referring again to FIG. 1, a collaborative delivery and display system 10 for preparing daily film rushes is now described in greater detail. In this embodiment of the collaborative delivery and display system 10, parsing and embedding software 34 is loaded on the server 32 at data center 30. Referring now to the post-processing facility 20, in such an embodiment, an encoding computer is routed to a slave duplication deck. There is a SCI feed with embedded audio, as well as a LTC feed. The AV log file 60 (e.g., an .FLX file or optionally an .ALE file) is compatible with DaVinci v.1005. The content 50 (media files) is encoded in real time at two or more bit rates. In one embodiment, the AV log file 60 is manually loaded into the encoding computer. Next, the AV log file 60 and the encoded media file 50 are uploaded via a FTP package to a project specific account on the server 32 of the collaborative delivery and display system 10. There is a header on the FTP package that informs the server 32 what is being uploaded and sends a message to the server that the upload session is over.

Referring now to the data center 30, in such an embodiment, the FTP (file transfer protocol) package, which contains the encoded media files 50 and AV log file 60, is received by the server 32 and read by the parsing and embedding software 34. The FTP header tells the server 32 to which account the content 50 (media file) is to be delivered. From the beginning of the upload, the media files 50 are automatically directed to the correct project account. The parsing and embedding software 34 then begins to segment the media files 50 when it receives a message from the encoding station that the upload session is complete. This message is referred to as the "chop trigger." As discussed above, technically, the original digital media files 50 are not chopped into segments, but rather copies of the digital media files 50 are segmented.

The parsing and embedding software 34 reads the FTP header (which contains directions to the proper account and the correct date) and the meta-data from the AV log file 60, matches the meta-data to the corresponding encoded frame of the encoded media files 50, combines the encoded media files 50 and meta-data, and segments (i.e., edits or copies into segments) the encoded media files 50 into appropriate segments (e.g., by scene number, take, or the like). The segmenting is dependent on the manner in which the AV log file 60 is created during the telecine process (or other audio/video editing process for an ALE file). As discussed above, when film "cuts" (i.e., rough edits) are processed, there is no associated AV log file. As such, the meta-data is typically input by a user manually for each segmented digital media file 50.

As mentioned above, the parsing and embedding software 34 of the collaborative delivery and display system 10 can parse both FLX files and ALE files. Notably, the FLX files and ALE files are both text-based, meta-data log files 60. This dual parsing ability is accomplished in the following manner. Once a user uploads a media file 50 with an associated FLX or ALE file, the parsing and embedding software 34 of the collaborative delivery and display system 10 opens the text file, translates the relevant information into an XML (Extensible Markup Language) file, which is a data-sharing format. The collaborative delivery and display system 10 then use the XML file to control the "copying and segmenting" of the master media file into individual scenes and takes, and embed the Scene, Take, Camera, Date, and Time code, as well as additional information into the database, thereby making the media files 50 searchable and selectable by a user of the collaborative delivery and display system 10.

The end result is the creation of a "digital daily" (and thus, "digital dailies" are the end result from an entire reel of content). In one embodiment, the method for preparing daily film rushes in the collaborative delivery and display system 10 takes approximately ten to fifteen minutes. The encoded media file 50 is DRM'D (i.e., secured using Digital Rights Management encryption), loaded into the project account, and available for viewing. After the media file 50 is "loaded" into the project account, the Calendar 80 feature, which is located on the collaborative display interface 70 (shown in FIG. 2), highlights the designated upload day.

Figure 5:
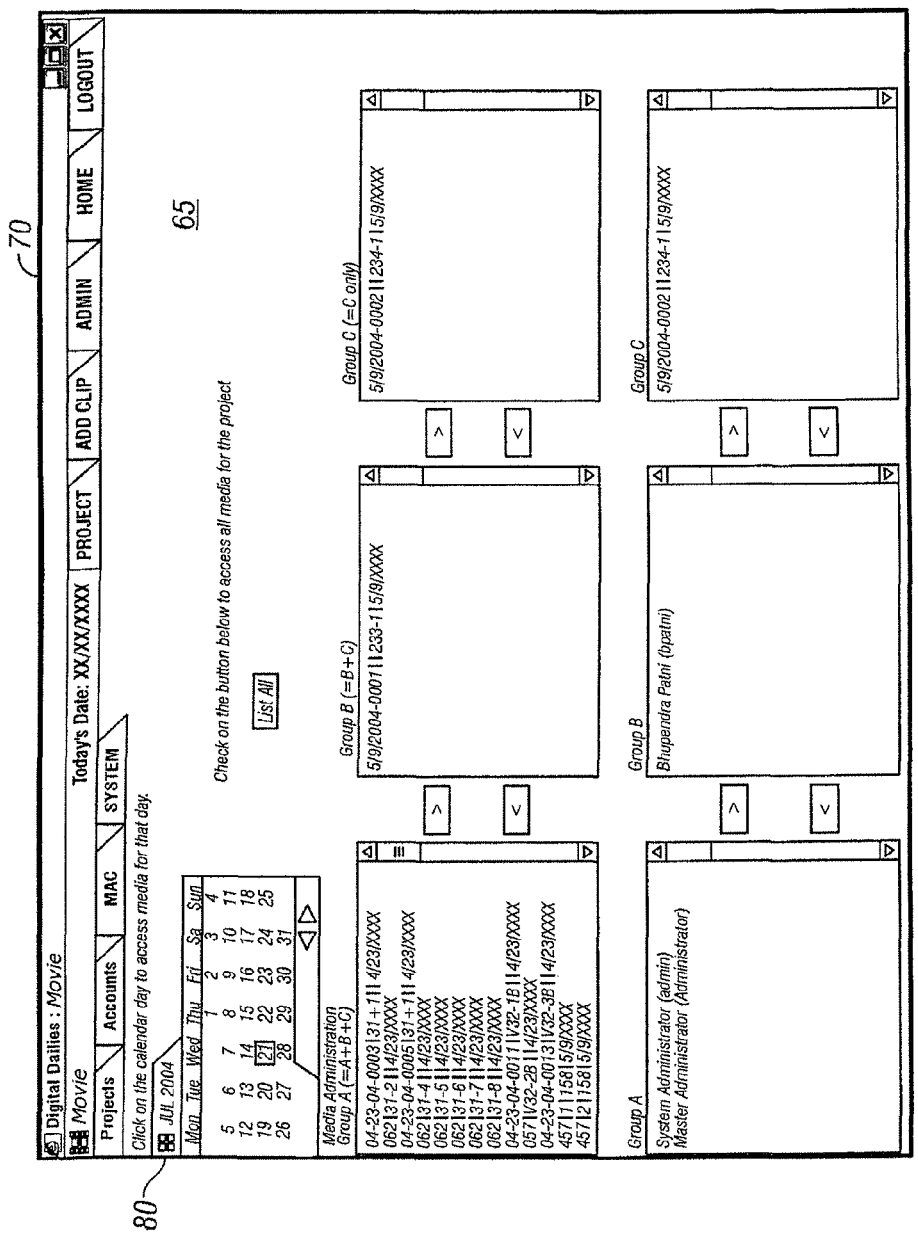
FIG. 5 illustrates a front view of the Media Access Control feature being used in a collaborative display interface of the collaborative delivery and display system.

Referring again to FIG. 1 and the administrator/end user location 40, in such an embodiment, each end user is assigned a login and password. Administrators are able to set permission rules for each end user (e.g., password and/or specific IP address). These permission rules may include, by way of example only, and not by way of limitation, restricting the account(s) that an end user is able to see, assigning a time window in which to view the media files 50, and creating a "viewing order" (permissions hierarchy). As stated above, this permissions hierarchy is referred to as MAC 65 (Media Access Control). An exemplary Media Access Control 65 window is shown in FIG. 5. The Media Access Control feature 65 is illustrated by the following example. In one embodiment, the director views the digital media files 50 first. If the director approves the dailies (digital media files 50), then the director opens up the viewing to the next group on the Media Access Control list. In one embodiment, if the director does not perform this task within a predetermined number of hours, the Media Access Control feature 65 automatically unlocks the digital media files 50 for the next group on the Media Access Control list. This process is then repeated for every group on the Media Access Control list.

Referring again to FIG. 2, the collaborative delivery and display system 10 enables a wide variety of features for enhancing end user interaction. For example, when digital media files 50 are ready for viewing, the associated account generates an e-mail notifying the end user of the availability of the digital media files 50. This e-mail is generated using account information that is given when the individual user accounts are created. In such an embodiment, an end user logs into the collaborative display interface 70 via a web browser and selects the appropriate project and content (digital media files 50) to view. The end user may enter the collaborative display interface 70, and select digital media files 50 to watch using the Calendar 80 feature or the Media List 90 feature.

In a collaborative display interface 70, the end user may view digital media files 50 in multiple bit-rates (e.g., a high bit-rate, a low bit-rate, and the like), as well as enter comments 92 to other users. These comments 92 are marked by a time-specific reference code and are forwarded to either all users or specific users. Additionally, these comments 92 may include time marker links 96 that, when selected, advance a currently-selected media clip to an exact time marker location within the media clip, thereby enabling a comment to be directly associated with an exact media clip frame. This action of exchanging and conglomerating comments 92 from end users is referred to as "dailies collaboration."

Figure 6:
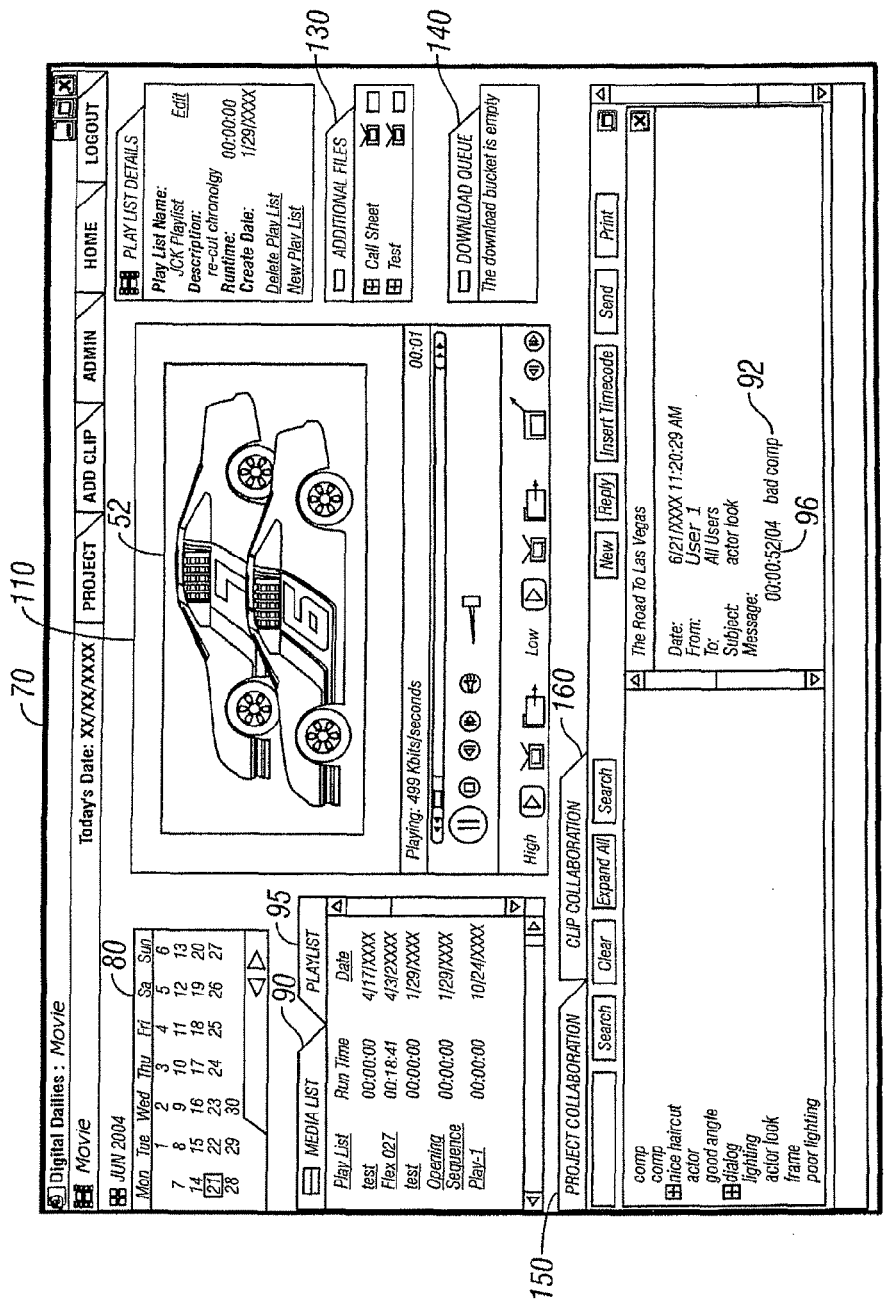
FIG. 6 illustrates a front view of the Play List feature being used in a collaborative display interface of the collaborative delivery and display system.
Figure 7:
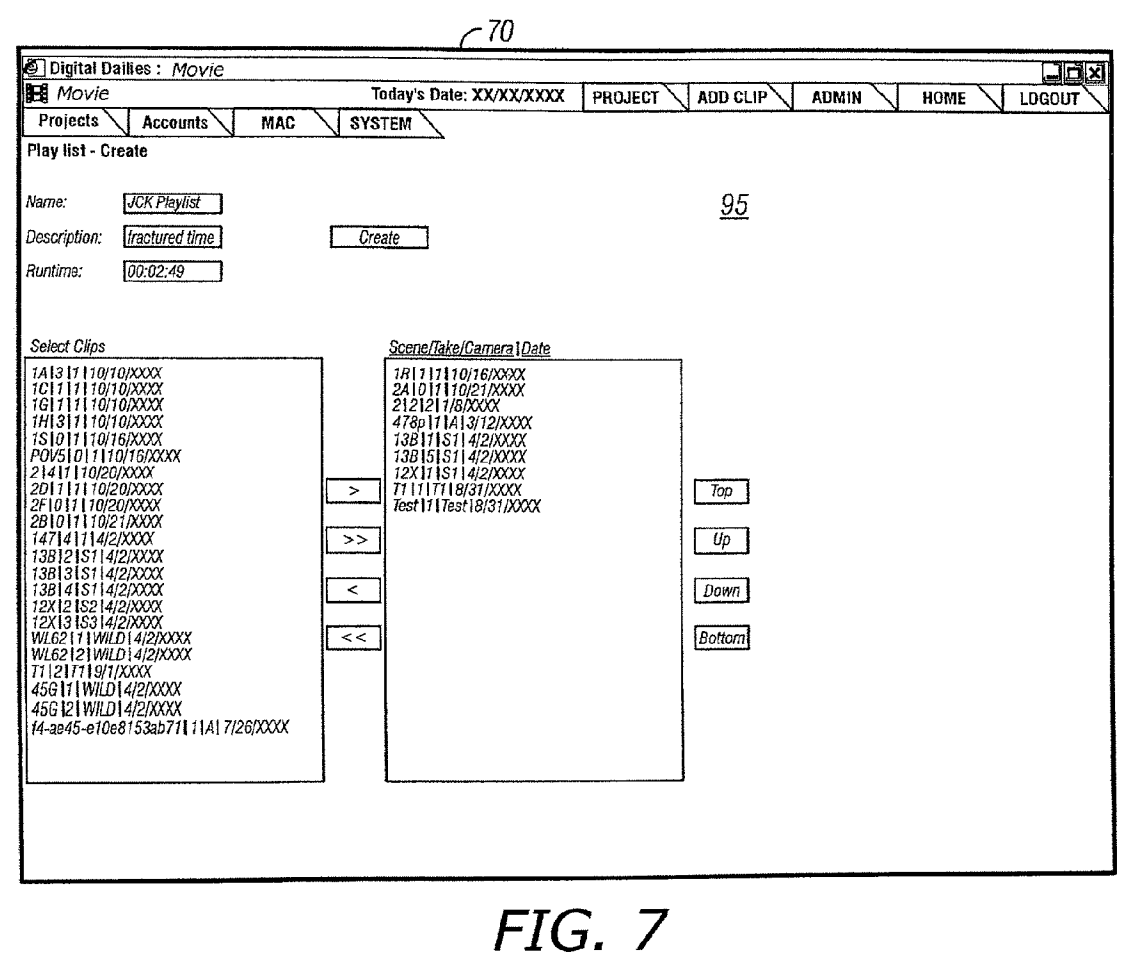

Referring now to FIG. 6, still another feature that is incorporated into the collaborative display interface 70 of the collaborative delivery and display system 10 is the play list 95 feature, which enables the creation of individualized play lists 95 of media files 50. In this regard, the digital media files 50 are often listed in the order dictated by the AV log file 60 (which is typically not the final sequence) or some other non-linear sequence order. End users may view media files 50 in a specific order (or have someone else view media files 50 is a specific order) for a variety of different reasons (e.g., a final sequence order, an actor-specific order, a location-specific order, and the like). This dynamic play list 95 feature, as shown in FIG. 7, enables end users to create individual play lists 95 by adding desired media files 50 to the play list window. This dynamic play list 95 feature reconfigures the selected media files 50 and plays them back as a single piece of content.

As mentioned above and shown in FIG. 3, another aspect of the collaborative display interface 70 of the system 10 is a media mark-up feature 100 that enables a user to notate and/or "mark-up" a media clip frame in an embedded media player 110. Otherwise stated, this media mark-up feature 100 provides the ability to link collaboration notes to a specific portion of a media clip frame in an embedded media player 110. Accordingly, an end user can "draw" over an area and/or attach comments to the media clip frame (e.g., a comment such as, "the car is out of focus").

In one embodiment, the media mark-up feature 100 is an ActiveX control within which the WINDOWS Media Player is embedded. The ActiveX control utilizes a transparent window form that allows a user to write "on top" of the WINDOWS Media Player. The transparent window form makes it appear as though the user is drawing on the media clip 52 that is being displayed by the Media Player. However, internally annotation graphics are being created on the hidden form. In one embodiment, vector, color, and time-code information relating to the annotation(s) is stored in an SQL Database so that other users may access the visual information by selecting a specific media clip 52 or project note. As mentioned above, in other embodiments, another embedded media player is utilized (instead of WINDOWS media player) including, by way of example only, and not by way of limitation, QUICK TIME, REAL PLAYER, and the like.

Still another aspect of the collaborative display interface 70 of the system 10 is the identification overlay feature. The identification overlay feature enables a user to automatically place the user's identification in the viewing window of the embedded media player 110. In one embodiment, there are eight locations for placement of the user's identification. This identification overlay feature serves as an additional security feature.

Referring generally to FIG. 1, in an alternate embodiment of the collaborative delivery and display system 10, the parsing and embedding software 34 is loaded on the encoding station at the post-processing facility 20 (instead of at the data center 30 as shown). Referring now to the post-processing facility 20, in such an alternate embodiment, an operator instructs the encoding station to submit the media files 50 and the AV log file 60 to the server 32. This action prompts the encoding station to start the FTP process. In the FTP process, a header is sent to server 32. Additionally, the master parsing and embedding software 34 sends an instruction set to an encoding station. This instruction set is the "chop trigger," which is sent to client parsing and embedding software 34 (i.e., a chop software component loaded onto the encoding station).

The parsing and embedding software 34 reads the meta-data from the AV log file 60, matches the meta-data to the correct encoded frame, combines the encoded media files 50 and meta-data, and "segments" (i.e., edits and/or copies into segments) the encoded media files 50 into predetermined segments (e.g., by scene number, take, or the like, dependent on the manner in which the AV log file 60 is created during the telecine or other AV editing process). Once again, technically, the original digital media files 50 are not chopped into segments, but rather are copied to produce "segmented" digital media files 50. Further, when film "cuts" (i.e., rough edits) are processed, there is no associated AV log file. Thus, the meta-data is typically input by a user manually for each segmented digital media file 50.

After this stage has been completed, a message is sent to the server 32 informing the master parsing and embedding software 34 that encoded media files 50 are ready for upload. In one embodiment, this is performed for each segment of content (e.g., reel, scene, and the like). Continuing, in this embodiment, the encoded media file 50 is uploaded via an FTP package to a project-specific account on the server 32 of the collaborative delivery and display system 10. Locating the proper account is determined by the FTP header, which specifies the project account. Referring now to the post-processing facility 20, in such an embodiment, the encoded media files 50 are DRM'D and loaded into the project account where they are available for viewing.

Figure 8:
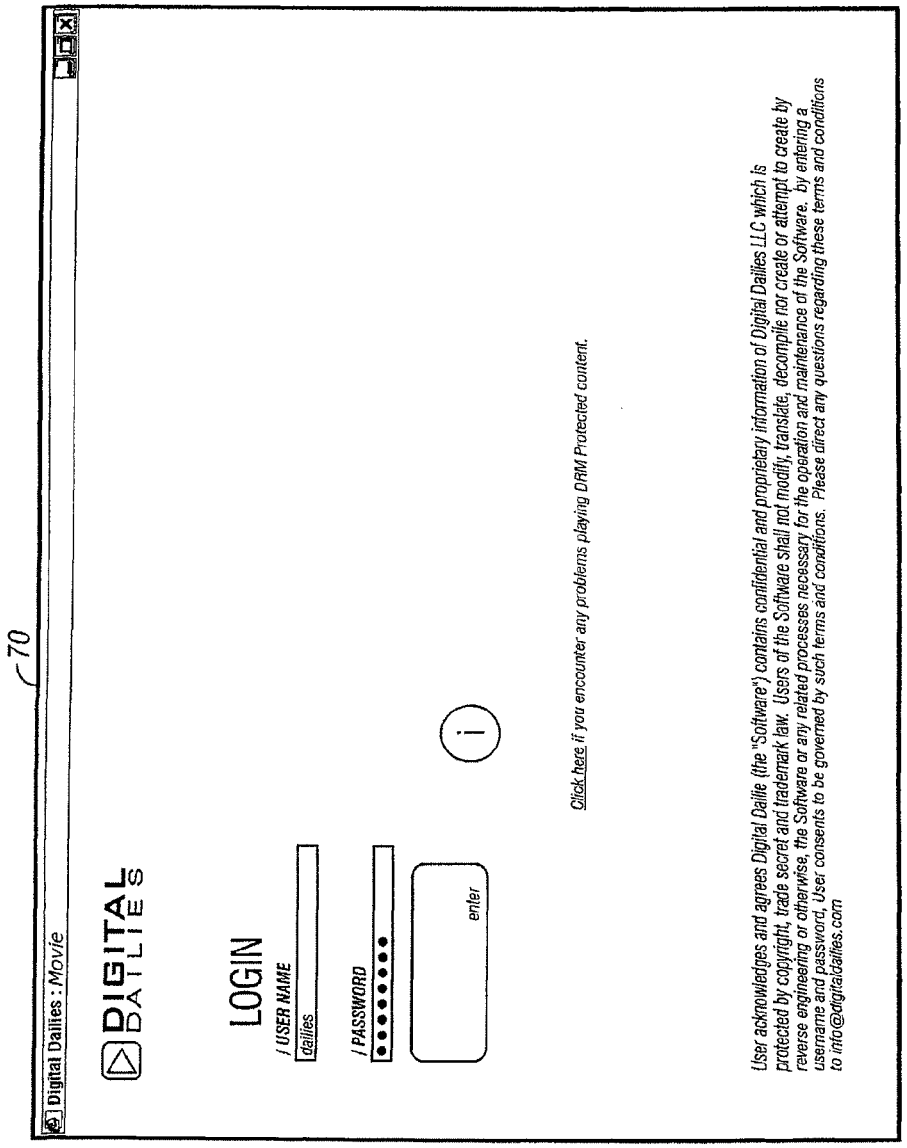
FIG. 8 illustrates a front view of a user login window in a collaborative display interface of the collaborative delivery and display system.
Figure 9:
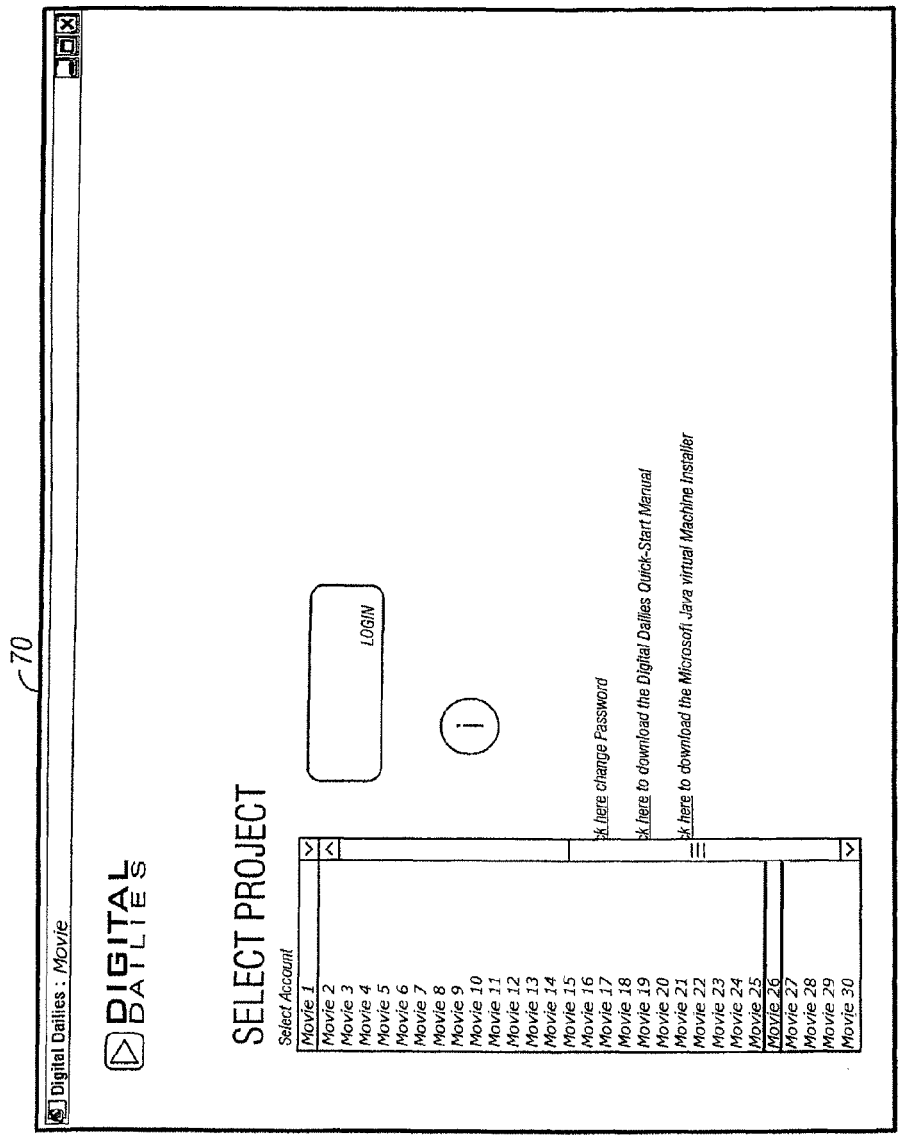
FIG. 9 illustrates a front view of a project selection window with a multiple account drop-down menu in a collaborative display interface of the collaborative delivery and display system.
Figure 10:
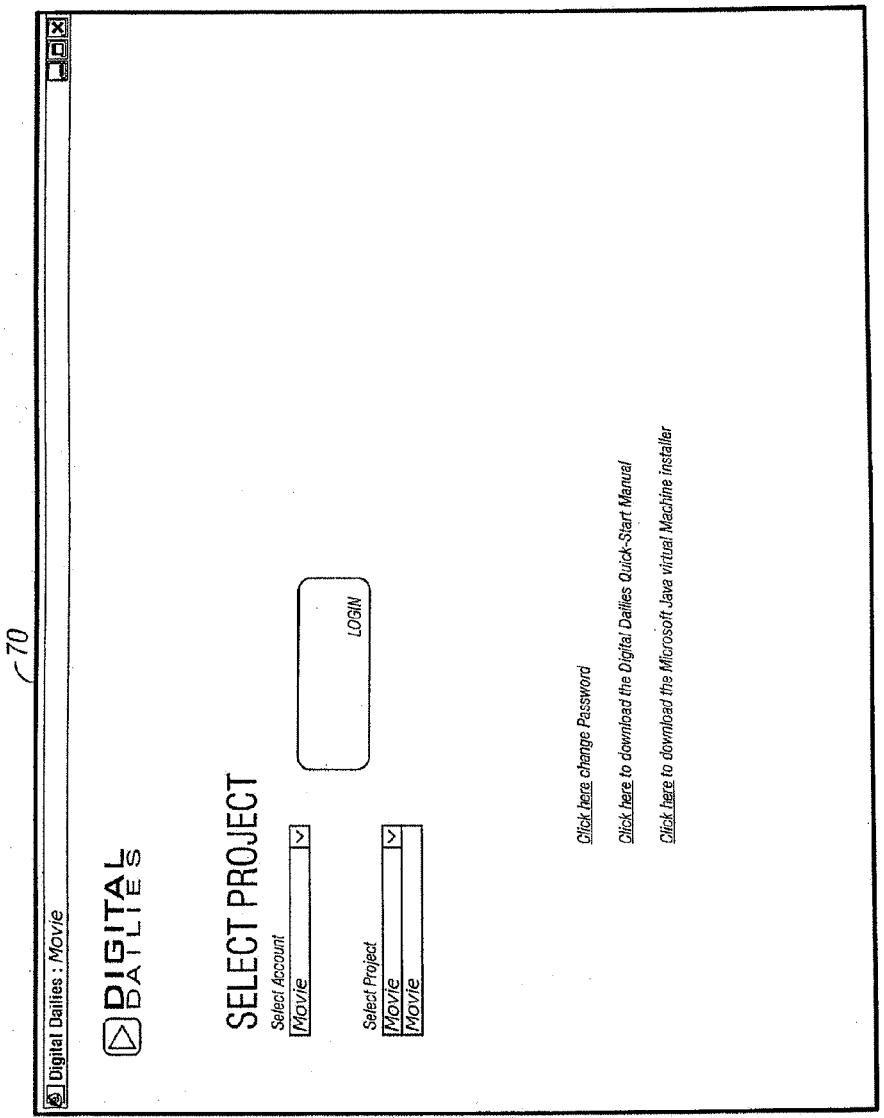
FIG. 10 illustrates a front view of a project selection window in a collaborative display interface of the collaborative delivery and display system.

In order to access the collaborative delivery and display system 10, view media clips, and collaborate with other end users, an end user must be connected to the Internet to take full advantage of this web-based application. Initially, a user opens the Internet Explorer and navigates to the www.digitaldailies.com web site. Alternatively, in another embodiment the user may access the collaborative delivery and display system 10 from a different location or web site. As shown in FIG. 8, a user enters a User Name and Password in the appropriate fields provided on the Login Page, after which the user selects the "Enter" button. If a user only has access to one active project, the user is taken directly to the collaborative display interface 70 of the collaborative delivery and display system 10, as shown in FIG. 4. If, however, the user has access to multiple projects, then the user is directed to a project selection page, where the desired project is selected from a "Select Project" drop-down list, as shown in FIGS. 9 and 10.

Referring now to FIG. 2, one embodiment of the collaborative display interface 70 is shown. The name of the project is located in the upper left corner of the screen. Additionally, to the right of the project name is the current date. Further, in the upper right corner of the collaborative display interface 70 are five tabs: the "Project" tab, the "Add Clip" tab, the "Admin" tab, the "Home" tab, and the "Logout" tab. The "Project" tab is the primary window that shows the project on which an end user is working. The "Add Clip" tab takes a user to a window that facilitates uploading additional media files 50. The "Admin" tab is used to access the administration window. The "Home" tab returns an end user to the "Select Project" window. Finally, the "Logout" tab logs an end user out of the system.

In one embodiment of the collaborative delivery and display system 10, the collaborative display interface 70 includes the following components: Media Calendar 80, Media List 90, Play List 95, Media Player Window 110, Media Clip Detail 120, Additional Files 130, Download Queue 140, Project Bulletin Board 150, and Clip Collaboration 160. In one aspect of the collaborative display interface 70, the Calendar 80 is an electronic calendar with selectable day icons. An end user is able to scroll to the desired month using the left and right arrows at the lower right corner of the Calendar 80. In one embodiment, "days on which media was shot," "telecined" (if this date is available in the AV log file 60), or "uploaded" are highlighted in blue. An end user simply selects the date for which the user wishes to see dailies, and all the media files 50 for that date are displayed in the Media List 90.

Referring now to another aspect of the collaborative display interface 70, the Media List 90 displays and sorts available media files 50 by scene number or date. The Media List 90 aspect of the collaborative display interface 70 is comprised of two components: the Media List 90 feature and the Play List 95 feature. In this regard, after a player has selected a date on the Calendar 80, the media files 50 for that day are displayed in the Media List 90 window. By selecting the Media List 90 tab, all available media files 50 for the current project are displayed. An end user is then able to sort the available media files 50 by scene number or date, simply by selecting the appropriate label.

Referring again to the Play List 95 feature of the collaborative display interface 70 as shown in FIG. 6, the Play List 95 feature enables an end user to compile and publish a plurality of media files 50 for viewing in a specified sequence, either by that end user or by others, provided that an account administrator has granted such rights. In one embodiment, viewing permission rules are determined by an account administrator. Specifically, a Play List 95 is an assemblage of separate media files 50 that have been connected together in order to be played in a continuous sequence (i.e., several media files 50 are stitched together so that they play as one sequence). In one embodiment, an end user views available Play Lists 95 by selecting the "Play List" tab, and then further selecting either the High or Low Bit-rate media file 50. In other embodiments, the digital media 50 is encoded in other bit-rates as well.

In one embodiment, an end user is able to create a Play List 95 by selecting the "New Play List" icon in the Play List Detail 120 window. Selecting the "New Play List" icon takes the end user to the Play List Creation window, as shown in FIG. 7. Here the end user may select the media files 50 that will comprise the Play List 95, as well as arrange the media files 50 in any desired order. To select a media file 50 for the Play List 95, an end user highlights the desired media file 50 in the "Select Clips" window and selects the single arrow [>] icon button to the media file 50 into the Play List field. The double arrow [>>] icon button moves all of the media files 50 into the Play List field at once. Further, an end user may adjust the order in which the media files 50 are played (as media clips 52) by selecting the "Up" and "Down" icon buttons, which are located to the right of the Play List 95 field. Additionally, an end user may also remove a media file 50 from a Play List 95 by highlighting the media file 50 and selecting an arrow to remove the media file 50 from the Play List 95 field. Once an end user has compiled a Play List 95, the end user then names the Play List 95 and selects the "Submit" icon button. The end user may also add a description to the Play list 95 that he has compiled, if desired. The Play List 95 then appears in the "Play List" window of the collaborative display interface 70.

Referring again to FIG. 2, in another aspect of the collaborative display interface 70, the player window 110 is the feature of the collaborative display interface in which digital media files 50 are viewed as media clips 52. Once an end user selects a media file 50 to view as a media clip 52 in the player window 110, the end user may then choose from several options, which are located at the bottom of the player window. These options are denoted by several small icons. These options include, by way of example only, and not by way of limitation: a stream icon and a download icon for the High bit-rate, a stream icon and a download icon for the Low bit-rate, and a stream icon and a download icon near the Time Code clock. The icons for High and Low have the same functionality except that they reference either high bit-rate or low bit-rate media (1500 Kbps and 500 Kbps respectively). In other embodiments, the digital media 50 is encoded in other designated bit-rates as well. The stream icon and the download icon are described herein as follows.

To stream a media clip 52 in the player window 110, an end user simply selects the "stream arrow" icon. Otherwise stated, the media clip 52 is played directly over the Internet, rather than from the computer hard drive. This method of playback permits full collaborative functionality, as the end user is viewing the media clip 52 in the player window 110 of the collaborative display interface 70. In one embodiment, the player window 110 is an embedded media player. For example, the embedded media player may be a WINDOWS Media Player. In other embodiments, another embedded media player is utilized including, by way of example only, and not by way of limitation, QUICK TIME, REAL PLAYER, and the like. Typically, prior to playback, the media clip 52 will "buffer" for a period of time, then commence playback.

Conversely, to download a media clip 52, an end user simply selects the icon of the small inverted triangle pointing to a hard drive (which resembles a small gray box) to initiate download of the media clip 52 to the end user's hard drive. In this scenario, the end user is saving the media clip 52 to the end user's computer. This enables the end user to view the media clip 52 at anytime, even if the end user is not connected to the Internet. When the end user is offline, the media clip 52 may only be viewed via the WINDOWS Media Player (or other embedded media player in another embodiment). Once the download icon is selected, a "File Download" widow appears that displays download information, such as the following, which is provided by way of example only, and not by way of limitation:

The selected files will be downloaded to your PC. If you have not yet viewed dailies for this project, please play at least one clip from the server (i.e., stream) so that a description key can be delivered to your system. These files can be quite large so we are using the Download Applet. The Microsoft File Transfer Manager bundles all the files you've purchased into a single package and downloads them all at once. Please answer "Yes" to the Authenticode dialog that may appear, asking you if you'd like to install the Download Applet.

This download information is displayed briefly followed by the AppletFile Download window. If, however, the end user has not already installed the Authenticode dialog, this will appear prior to the AppletFile Download window. In one embodiment, the AppletFile Download window inquires:

Do you want to download the requested files from server 123.456.789.12 to C:\SampleDailies Vault on your hard disk?

In one embodiment, a positive response to this inquiry creates a default download directory for the collaborative delivery and display system 10 located on the end user's computer hard drive at "C:\SampleDailies Vault." Further, the end user may select the "Save All" icon button to download and save all selected media files 50. Alternatively, by selecting the "Save All To . . . " icon button, an end user may select a new download location. Additionally, an end user may select the "Cancel" icon button at any time to exit from this window, or the subsequent Download Progress window.

In another aspect of the collaborative display interface 70, an "Add to Queue" icon button is also provided. The "Add to Queue" button appears as a green square outline icon that an end user may select in order to add a media file 50 to the end user's Download Queue 140. Otherwise stated, as an end user is viewing various media clips 52, the end user can select one or more clips to be downloaded later by adding those clips to the Download Queue 140. The Download Queue 140 stores selected media clips 52 until an end user is ready to download them at a convenient time. The end user simply selects the "Download Now" tab and a File Download window appears. Here the end user confirms the media clips 52 that are desired to be downloaded, as well as unselecting any media clips that are no longer desired to be downloaded. The remainder of the process mirrors the download process described above.

In yet another aspect of the collaborative display interface 70, a "Full Screen" icon button is also provided. The "Full Screen" feature is denoted by a highlighted green window that has an arrow projecting from the upper right corner of the window. In one embodiment, the "Full Screen" icon button is located next to the Time Code Clock. An end user selects this icon to view a media clip 52 in full-screen mode that is already playing in a non-full-screen mode. Although the "Full Screen" works with either the low or high bit-rate media clips 52, this feature is better suited for (i.e., delivers the best quality when) viewing high bit-rate media clips. In one embodiment, once a media clip 52 finishes playing a full-screen mode, an end user is automatically returned to the collaborative display interface 70 in non-full screen mode. Further, an end user may exit the full-screen mode prior to completion of a media clip 52 by selecting the "Esc" key on a keyboard.

In still another aspect of the collaborative display interface 70, a reference time code (e.g., a non-SMPTE (Society of Motion Picture and Television Engineers) time code) for a specific media clip 52 is displayed in the lower right hand corner of the Player Window 110. Alternatively, another time code may also be utilized, including by way of example only, and not by way of limitation, the SMPTE time code. In one embodiment, the Player Window 110 also includes player buttons that are the same as those typically displayed on a standard WINDOWS Media Player and are similar to the buttons on a VCR. These player buttons may include a "Play" button (which becomes the "Pause" button when a clip is playing), a "Stop" button, a "Fast-Forward" button, a "Rewind" button, and a "Mute" button. In one embodiment, a volume slider that serves to increase or decrease the volume of the media clip 52 being played is located to the right of the "Mute" button. Additionally, a embodiment also includes a scrolling slider, positioned above the player buttons, which indicates the progress status within a media clip 52.

In one embodiment, another aspect of the collaborative display interface 70 is the Media Clip Detail 120 window. The Media Clip Detail 120 window displays meta-data (e.g., AV log file 60 information, time code, scene name, take, camera, and the like) for media clip 52 when selected in the Media List 90. In one embodiment, the Media Clip Detail 120 window refreshes the details for every scene that an end user selects in the Media List 90.

In another aspect of the collaborative display interface 70, an Additional Files 130 window is included that displays any additional files that have been uploaded and associated with a specific media clip 52, date, or project. These include Storyboards, Call Sheets, Location Maps, Lab Reports, OMF files, and the like. An end user can decide whether or not to download these additional files by selecting either the "Download Now" icon button or the "Download Later" icon button, which are located to the right of the files. After being downloaded, these media clips 52 are located in a folder entitled "Sample Dailies Vault" on the end user's computer hard drive.

As mentioned above, in a collaborative display interface 70, a Download Queue 140 window is included in which the media clips 52 that are selected for later download are displayed until they are downloaded. As described above, the Download Queue window acts as a download bucket or cart that allows an end user to queue up multiple media clips 52 and files for simultaneous download. Thus, the Download Queue 140 window enables an end user to select media clips 52 and files for a later download while the end user is working, rather than having to download the media clips 52 one by one. In one embodiment, a dialog box states, "X file(s) in queue," where X is the number of media clips 52 and files that have been queued. In another aspect, by selecting a "Download Now" icon button a "File Download" window appears. Here an end user can double check the media clips 52 and/or files that are desired to be downloaded. Conversely, an end user may remove files from the "Download Queue" by un-selecting files that are no longer desired to be downloaded.

Referring again to another aspect of one embodiment, the collaborative display interface 70 also includes a Project Bulletin Board 150 window. The Project Bulletin Board 150 window is similar to the Clip Collaboration 160 feature, except that end users post notes/comments that are associated with the entire project (for the Project Bulletin Board 150 window) as opposed to the media clip 52 or frame specific comments (for the Clip Collaboration 160 window). When an end user selects the Project Bulletin Board 150 tab, the end user is then able to post messages to every user with access to the project. Further, the end user can view posted messages from other users by clicking on their discussion topics, which are listed to the left of the Project Bulletin Board 150 window. If the topic is popular and many others have made replies to the topic, then messages regarding the topic will be displayed in the same fashion as an Internet user group thread. To view messages on the Project Bulletin Board 150, an end user selects a small triangle arrow that is located to the left of the listed Subject. Additionally, an end user creates a new message by selecting the "New" icon button found in the upper-middle of the Project Bulletin Board 150 window. The end user then enters the Subject, after which the end user simply types in the message. Lastly, to reply to another user's message, a user simply selects the specified message and then clicks the "Reply" icon button.

As mentioned above, in another aspect of one embodiment, the collaborative display interface 70 includes a Clip Collaboration 160 feature. The Clip Collaboration 160 feature enables a user to collaborate on a specific media clip 52 or clip frame. This feature functions in the same manner as the Project Bulletin Board 150 except that the Clip Collaboration 160 feature is specific to the currently selected media clip 52. In one embodiment, messages that are created in Project Bulletin Board 150 can be sent to "All Users" or to specific individuals within a selected project. Specifically, an end user can select the message recipient(s) by clicking on a drop-down menu located in the "To" bar of the "New Message" window.

If an end user's message references a certain point on a media clip 52, the end user can insert a time code marker into the message by playing the clip in the Player Window 110, and selecting the "Insert Time Code" icon button at the frame that is desired to be referenced. In this manner, a Time Code can be placed directly into a message. When an end user has finished typing the message, selecting the "Send"

button displays the message on the left of the Clip Collaboration 160 window. As discussed above, to reply to another user's message, simply select the message and then click the "Reply" icon button. In one embodiment, if an end user is replying to a message that references a Time Code, the end user simply selects the Time Code link. The media clip 52 then pre-rolls for five seconds after which it pauses at the referenced Time Code.

Figure 11:
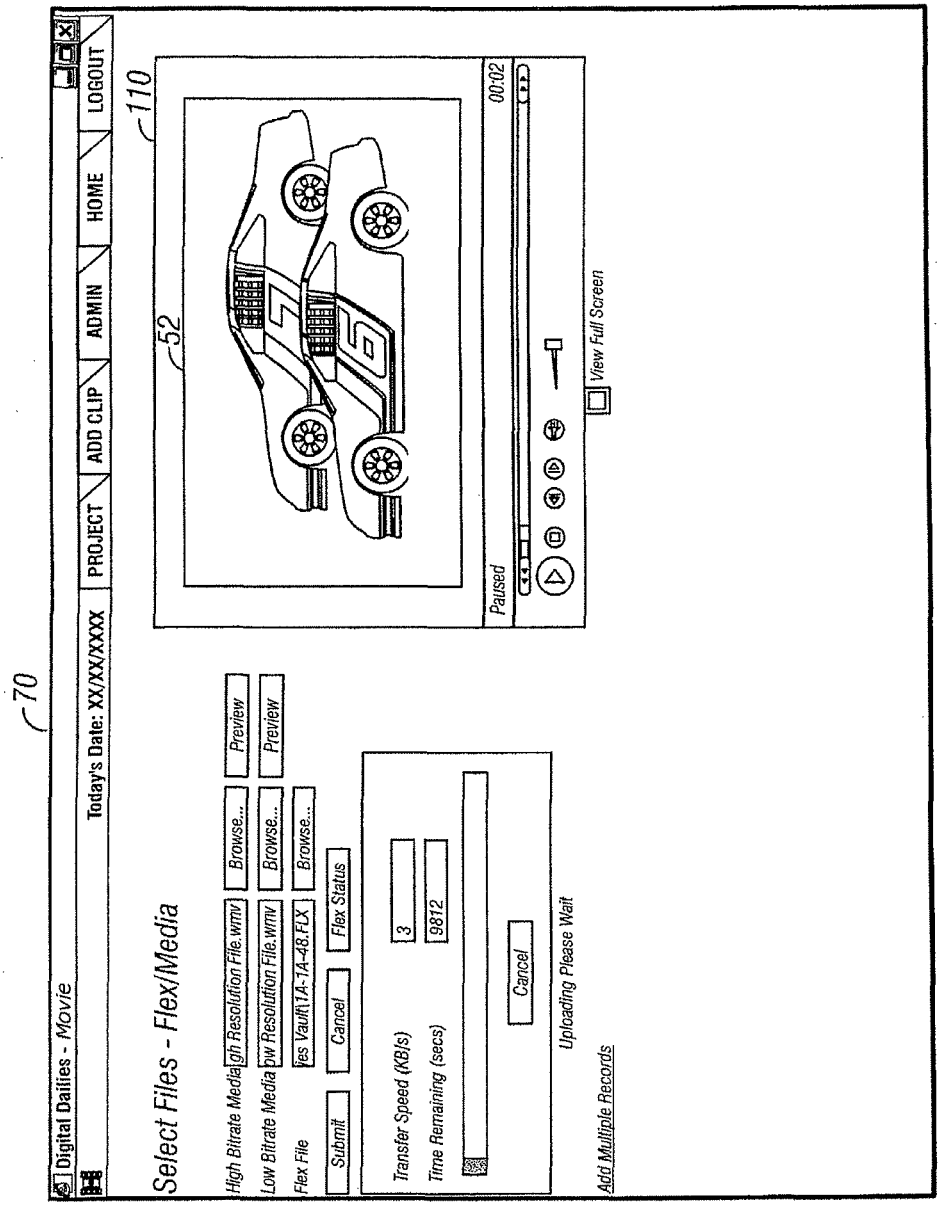
FIG. 11 illustrates a front view of a file upload window in a collaborative display interface of the collaborative delivery and display system.

Referring now to the "Add Clip" tab (shown in FIG. 2) and media file 50 upload options shown in FIG. 11, by selecting the "Add Clip" tab, which is located in the upper right-hand corner of the collaborative display interface 70, a user can access the "Add Clip" window and add new media files 50 to its account. Once inside the Add Clip window, four additional tabs are located to the left of the collaborative display interface 70 that offer several different upload options, including Automatic, Manual, Multiple, and Additional.

Figure 12:
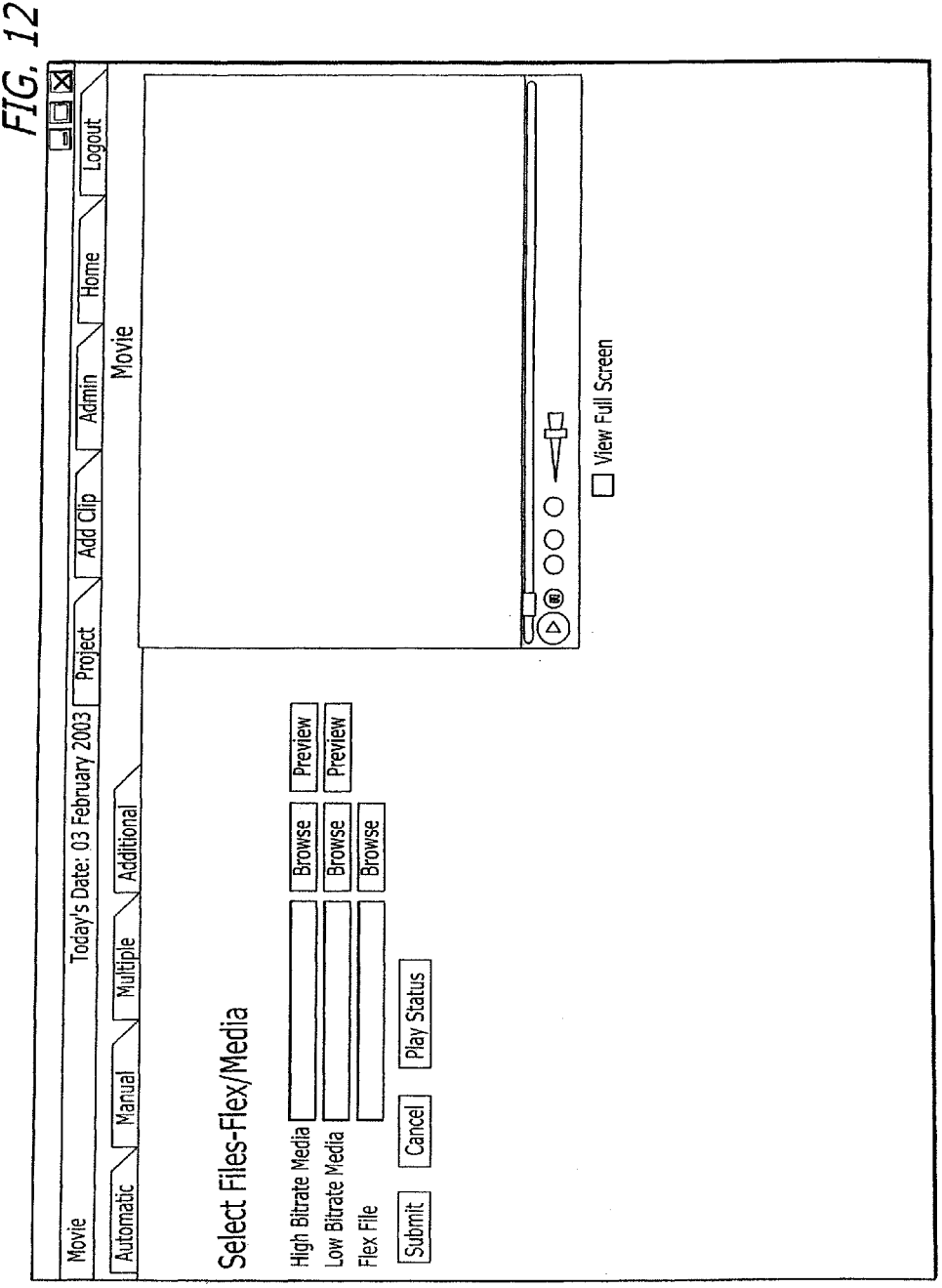
FIG. 12 illustrates an automatic upload option for uploading media files.

Referring now to the Automatic upload option, a sample screen shot is shown in FIG. 12. The "Automatic File Upload" option is the fastest and most basic technique for uploading media files 50. A user simply selects the "Browse . . . " icon buttons, which are located next to the High Bit-rate Media icon, the Low Bit-rate Media icon, and FLX file icon, and then selects the "Submit" icon button. A user can view the media files 50 that he has selected at any time by clicking on the "Preview" icon button. Additionally, a user may remove a previously selected media file 50 by selecting the "Cancel" icon button. Furthermore, a user may view the AV log file 60, (e.g., Flex file) by clicking the "Flex Status" icon button.

As shown in FIG. 13, the "Manual File Upload" option is used to upload a media file 50, such as a rough cut. Manual Upload permits a user to customize meta-data descriptions. To use the Manual Upload feature the following steps are utilized: (1) from the "Account" tab, select the desired project to which media files 50 will be uploaded; (2) insert a specific name or title for the associated content using the field named "Title;" (3) add information regarding the media file 50 by entering the desired description in the field titled "Description;" (4) enter the date of shooting in the field named "Shoot Date;" (5) enter the time of day filming occurred in field titled "Start Time;" (6) enter the length of the media clip 52 in the field marked "Duration;" (7) enter the frame rate of original footage in the field named "Frame Rate;" (8) enter information regarding scene, camera, shot number, and take, in the fields named "Scene," "Camera," "Shot," and "Take," respectively; (9) add media files 50 via the fields named "Hi Bit-rate" and "Low Bit-rate;" and (10) upload additional files (e.g., Call Sheets) by selecting the field titled "Call Sheet/Additional Files." When complete, the end user clicks the "Select" tab.

Figure 14:
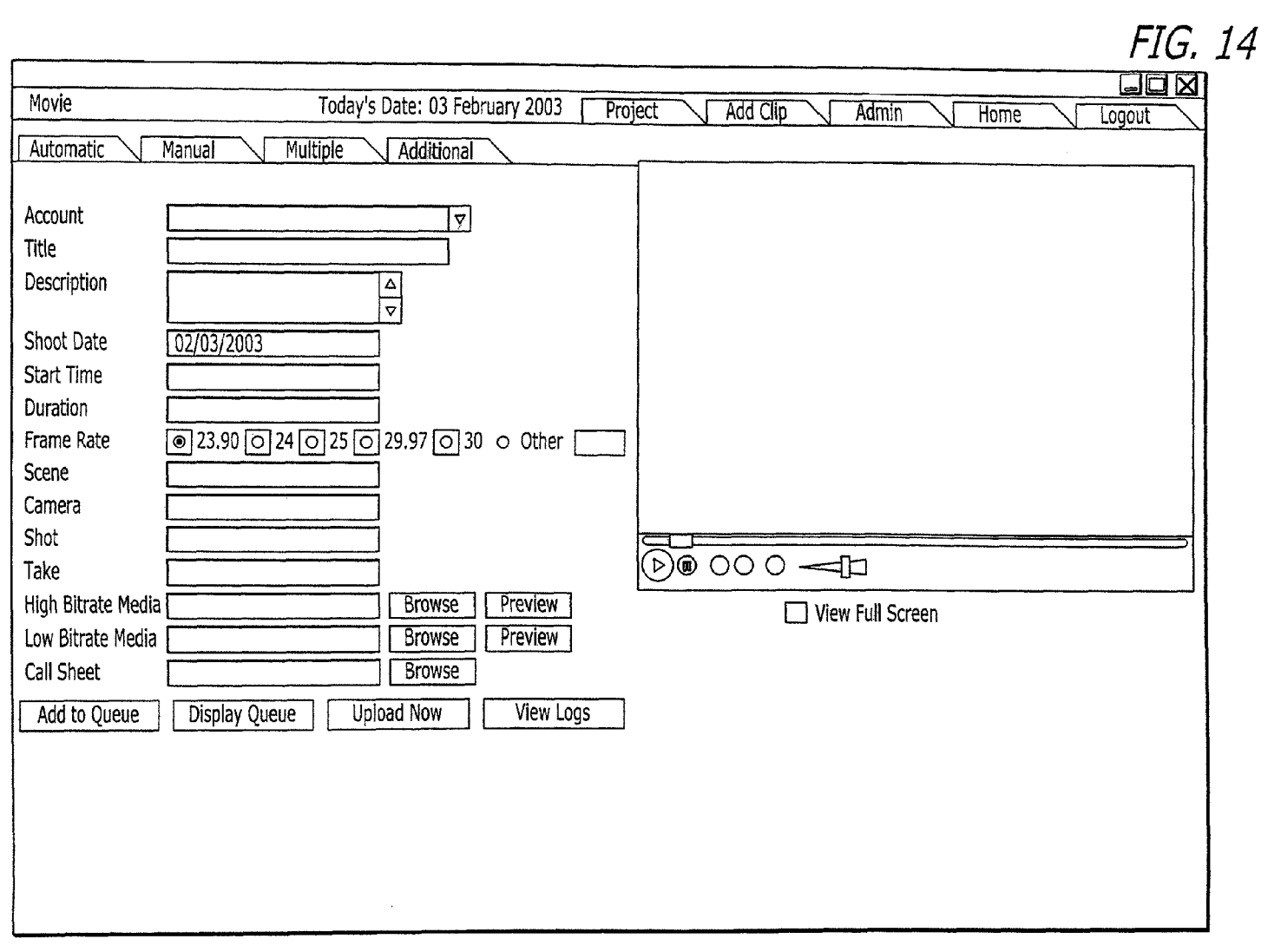

As shown in FIG. 14, the "Multiple File Upload" option includes the same basic features as the Manual File Upload as well as several additional features. In one embodiment, an end user selects the "Add to Queue" tab once the descriptive fields have been completed in order to add an additional media file 50 to the upload queue. In another aspect, the "Add to Queue" tab permits the user to add as many files as desired to an upload "queue" for simultaneous upload. To monitor the upload process, an end user selects the "Display Queue" tab. To begin uploading the media files 50, a user selects the "Upload Now" tab. To review an upload log of the media files 50 that have been selected, an end user selects the tab titled "View Logs."

Figure 15:
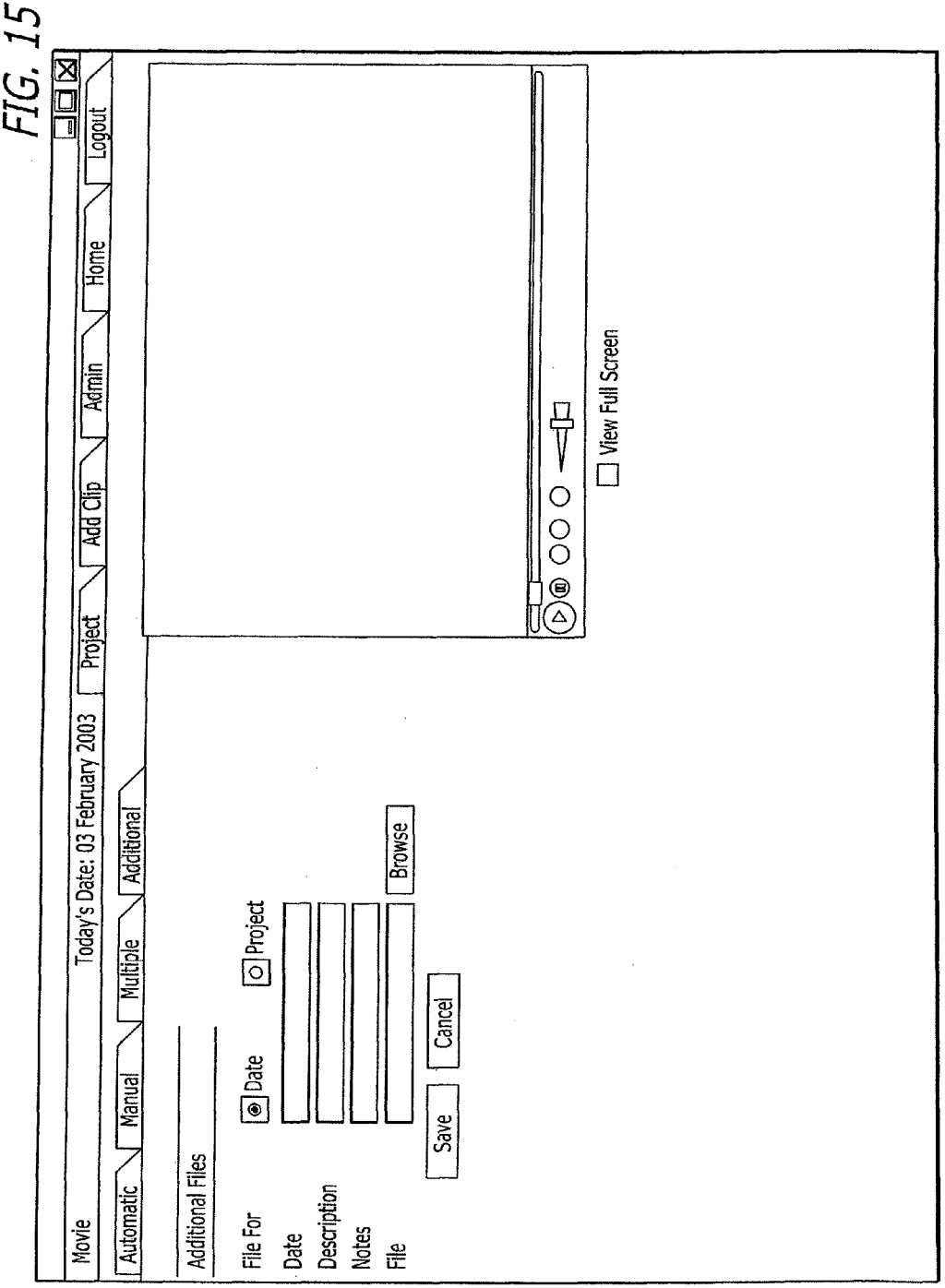
FIG. 15 illustrates an Additional File Upload option enabling an end user to upload additional media files.

As shown in FIG. 15, the "Additional File Upload" option enables an end user to upload additional media files 50. In one embodiment, additional media files 50 are uploaded to a project by Date. An end user enters the Date (if applicable), Description, and any notes on the media file 50. The end user then selects the "Save" tab to upload the media files 50. To cancel, an end user selects the "Cancel" tab.

Still another window in one embodiment of the collaborative display interface 70 is the Administration (or "Admin") window, which is accessed by selecting the Admin tab. Inside of the Admin window are two new tabs, the Accounts tab and Groups tab, which are located on the left side of the collaborative display interface 70. The Accounts tab and Groups tab provide end users access through which to manage administration accounts (projects) as well as individual users.

Yet another aspect of the collaborative delivery and display system 10 is the user accounts. The user accounts are divided into two sections, the Account Administration window (FIG. 16) and the User Administration window (FIG. 17).

In the Account Administration window, an account is selected by name. In another aspect, after an account is selected, a user list below the account is updated with a list of users for the account that has been selected. In one embodiment, the account information appears to the right of the accounts list.

To edit the information for the account, a user selects a pencil-shaped icon, which is located to the right of the account name. Alternatively, a user may edit account information by selecting an "Edit" icon button, which is located below the account information. In another aspect, several fields appear to the right of the accounts list. In one embodiment, a user may update or change the fields for the account Name, Description, (select an) Account Type, Director, Director URL, Copyright, (select a) Rating, (select your desired security level of) License Rights, and the V2RegPage. In another aspect, changes to such information may be negated simply by selecting the "Cancel" icon button, which reverts these fields to their former entries. Conversely, to save these changes, an end user selects the "Save Account" icon button.

As shown in FIG. 18, selecting the "Add New Account" icon button, which is located above the accounts list, creates a brand new account. Next, the afore-mentioned fields are filled in (or otherwise populated), and a "Create Account" icon button is selected, which is located directly below the information fields. Additionally, a user may delete an account, simply selecting the trash can icon found to the right of the account name and edit pencil icon.

Figure 19:
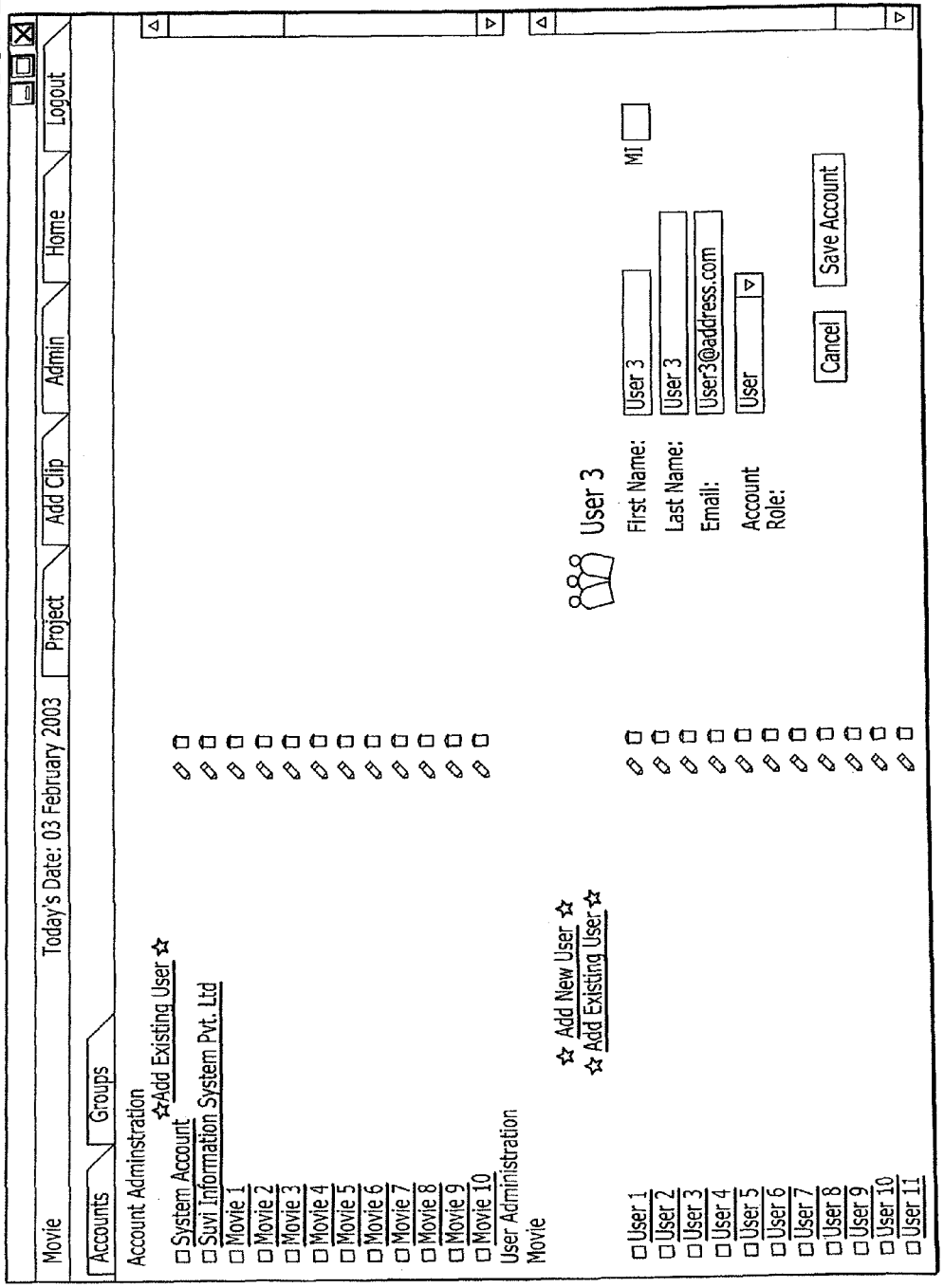
FIG. 19 illustrates a User Administration window in which a user's information appears to the right of the list of users by selecting a user's name.

The User Administration window offers similar functionality to that found in the Account Administration window. In one embodiment shown in FIG. 19, by selecting a user's name, the user's information appears to the right of the list of users.

As in the Administration Account above, a user selects a pencil-shaped icon in order to edit the information for the account, which is located to the right of the account name. Alternatively, a user may edit his or her account information (e.g., password, user profile, and the like) by selecting an "Edit" icon button, which is located below the account information. In another aspect, several fields appear to the right of the accounts list. In one embodiment, a user may update or change the fields for the user First Name, MI (middle initial), Last Name, Email, and their Account Role. In another aspect, changes to such information may be negated simple by selecting the "Cancel" icon button, which reverts these fields to their former entries. Conversely, to save these changes, an end user selects the "Save User" icon button.

Figure 20:
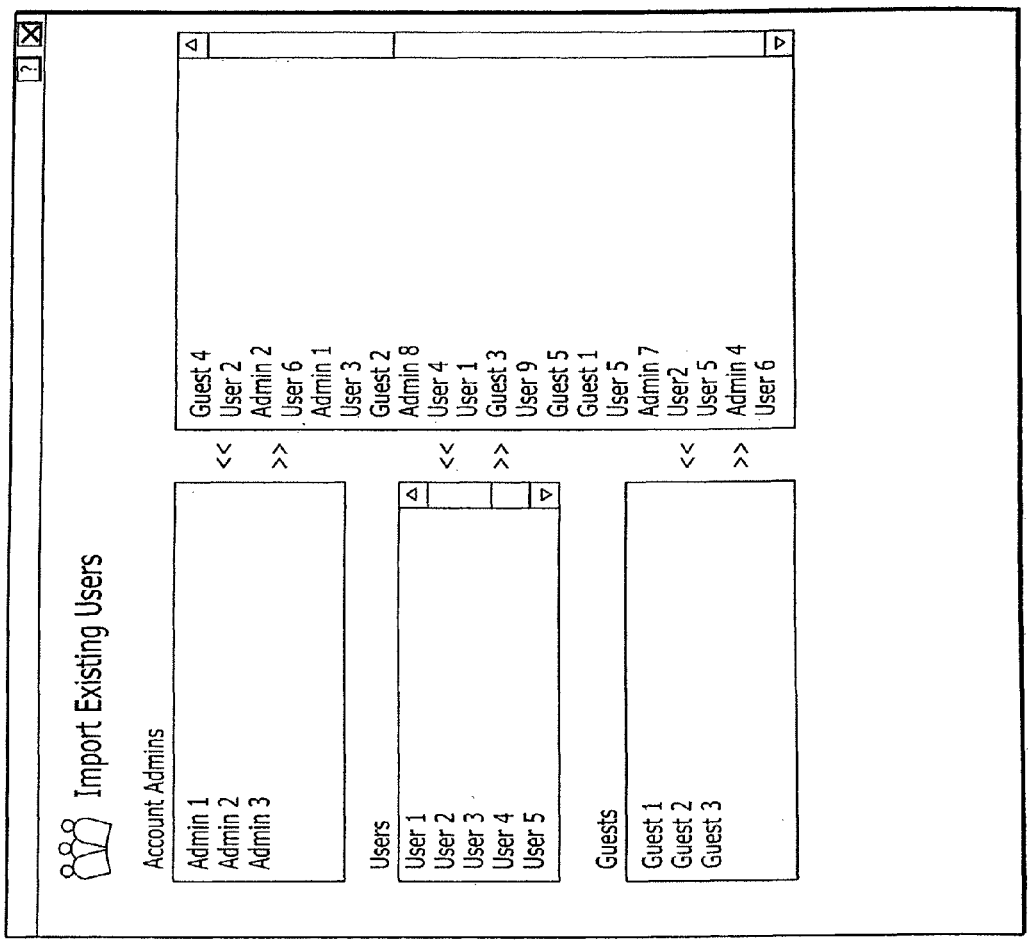
FIG. 20 illustrates the importing of existing users.

Selecting the "Add New User" icon button, which is located above the accounts list, creates a brand new account. The aforementioned fields are then filled in, as well as the Password and Confirm Password fields to establish the user's password, which is used to log onto the collaborative delivery and display system 10. After completion of these steps, the "Create User" icon button is selected, which is found directly below the information fields. As shown in FIG. 20, existing users can be imported.

Additionally, in one embodiment of the collaborative delivery and display system 10, users can also be pre-established for selected accounts by selecting the "Add Existing User" icon, which is located above the users list. After selecting this icon, a small window is launched that displays fields for Account Administrators, Users, Guests, and all Available Users. In another aspect, users may be shuffled in and out of desired account access levels by selecting a user, which highlights the user's name, and then selecting the double arrows (">>","<<") to move users in and out of the desired account access levels. Account Administrators have the ability to change and update all information and media files 50 in an account. Users can access the account to see media files 50 and participate in the collaboration features of the collaborative display interface 70. In some embodiments, guests have limited access to all account features. Additionally, a user may be deleted by simply selecting the trashcan icon, which is found to the right of a user name and edit pencil icon. Lastly, by selecting the "Home" tab a user is returned to the Select Project window where the user can switch to a different project account. To exit, a user may simply select the "Logout" tab.

In another aspect, the collaborative delivery and display system 10 includes several various components to enable proper functionality. Examples of such components are described below, and are listed by way of example only and not by way of limitation. In one embodiment, the screen design of the collaborative display interface 70 of the collaborative delivery and display system 10 is built in ASP.Net and DHTML (dynamic hypertext markup language), with some screen components in macromedia FLASH. The following are the components of the home page in one embodiment.

In one embodiment, WINDOWS Media Player 7.1, 9, or higher is used as an embedded media player 110 to play a media clip 52. In such an embodiment, the WINDOWS media rights manager (wmrm.exe) components are used to protect the WINDOWS media files 50. Accordingly, the WINDOWS Media Player 110 is used as the underlying technology for the embedded player. Further, in such an embodiment, the WINDOWS media ActiveX control is used to display the embedded media player on the web page. As stated above, in one embodiment, there are two digital media files 50 uploaded for each take: a 500K file and a 1500K file. Further, in one embodiment, the maximum size of a media clip 52 is 640×480. Once again, in other embodiments, another embedded media player is utilized (instead of WINDOWS media player) including, by way of example only, and not by way of limitation, QUICK TIME, REAL PLAYER, and the like.

Referring now to another aspect of one embodiment, a Flex Reader (or AV log File Reader) reads meta-data from the AV log file 60 in bulk, and not "scene by scene." In still another aspect, the Flex Reader is written in VB.Net and converts the AV log file 60 (either the .FLX file or the .ALE file) to an XML (Extensible Markup Language) file. In this embodiment, ASF Chop ActiveX control (ASFChop.ocx) is used to chop the media file 50. Further, in one embodiment, the database component is written in Vb.Net in order to save data in the database. Additionally, WINDOWS Media Rights manager components are used to protect the WINDOWS media files 50.

Referring now to the Calendar feature 80 of the collaborative display interface 70, the Calendar feature is designed using Macromedia FLASH. In one embodiment, the calendar control is shown on the left side of the screen. In another aspect, the dates for which media files 50 are available are shown in a different color. In one embodiment, when a user selects a particular date, a list of available media files 50 for that date is shown in a Scene Explorer feature.

In an embodiment of the collaborative delivery and display system 10, the Scene Explorer feature uses Data Grid control to show a list of scenes (i.e., available media files 50). The Scene Explorer shows the list of scenes for a particular date when a user selects a date in the Calendar feature 80. The Scene Explorer can also be used to show all the media files 50 for a film or other feature.

Continuing, in another aspect of a collaborative delivery and display system 10, the Message Board is designed in DHTML (dynamic hypertext markup language). In another aspect, Treeview.HTC is the HTML (hypertext markup language) control used to design the tree structure of the messages. Further, in the one embodiment, the COM component is developed using VB6 (or higher) and the web page is built in ASP.Net, which is server-side Web technology developed by MICROSOFT.

In one embodiment, the Message Board is designed to post comments, in the form of mail, to a specific end user or to all of the end users working on a particular project (e.g., film or other feature). As explained above, end users can insert time-code markers into the message while watching a media clip 52. This time-code marker is the clip time taken from the current media clip 52. In another aspect, the Message Board is displayed at the bottom of the collaborative display interface 70. Additionally, one embodiment also includes a clip detail window that displays all of the detailed information about the selected media clip 52.

One embodiment of the collaborative delivery and display system 10 comprises several features and functionalities that provides significant advantages including, by way of example only, and not by way of limitation, collaborative functionality, multiple file transport, customized delivery systems, and transactional efficiencies. Regarding collaborative functionality, the collaborative delivery and display system 10 provides time-based and scene-based threaded commentary, hierarchical user groups, and review and approval functionalities, such as editorial approval of rough cuts or selects. Additionally, the collaborative delivery and display system 10 supports multiple file transport, including playback of WINDOWS Media files 50, and the transport of all related files, such as: PDF, AVID, FLX, EDL, Excel, Word, and Text files.

Further, the collaborative delivery and display system 10 is adaptable; depending on the client's need, and can be customized accordingly. For example, in an alternate embodiment, customized delivery systems are incorporated that deliver media files 50 and other information over proprietary networks or satellite-based IP, as well as high-speed Internet connectivity (e.g., consumer grade DSL). Finally, the collaborative delivery and display system 10 delivers end users substantial cost and time savings. The transactional efficiencies of the collaborative delivery and display system 10 potentially eliminate thousands of dollars of costs associated with courier and administrative charges.

For proper functioning, the collaborative delivery and display system 10 has several minimum requirements. On the Server and Data Storage side, the collaborative delivery and display system 10 has minimum requirements of two dual P111 800 Mhz Xeon servers with 1 GB RAM each. In this minimum requirements embodiment, server 1 is the WinMedia Services Server that runs Win2000 Advanced Server, and server 2 is the Application Database & Web Page Server that runs Win2000 Advanced Server and SQL Server 2000. As stated above, these are minimum requirements for the collaborative delivery and display system 10, and as such, higher-level components may also be utilized without departing from the scope of the disclosure.

In a recommended requirements embodiment, the collaborative delivery and display system 10 has three dual P4 2.2 GHz Xeon servers with 2 GB RAM each. In such an embodiment, Server 1 is the WinMedia Services Server that runs Win2000 Advanced Server, Server 2 is the Web Page Server that runs Win2000 Advanced Server, and Server 3 is the Application Database that runs Win2000 Advanced Server and SQL Server 2000. As stated above, these are recommended requirements for the collaborative delivery and display system 10, and as such, higher-level components may also be utilized without departing from the scope of the disclosure.

In either of the above configurations, storage for media files 50 is a separate issue. In one embodiment, a NAS (Network Attached Storage) device or an array (SCSI or IDE w/ IDE bridge) is utilized, which offers greater expandability than internal storage. Additionally, in one embodiment of the collaborative delivery and display system 10, the encoding workstation includes the Digital Rapids Stream DRC-1500 Encoder card w/SDI. In other embodiments, other components with comparable specifications may alternatively be utilized.

Referring now to the post-production company integration process, the minimum hardware requirements for the collaborative delivery and display system 10 includes a dual Intel Xeon Processor (2.2 GHz) with a Digital Rapids DRC Stream-1500 capture/encoder card. In another aspect, the encoding station also utilizes a keyboard, mouse, and monitor. Regarding connectivity, the post-production location 20 includes Internet connectivity of T1 speed or greater, web access via HTTP (hypertext transport protocol) and FTP (file transport protocol) ports, and power.

In another aspect, the physical location of the post-production location 20 provides in-line access with a Source DigiBeta deck. In one embodiment, the video/audio feed is SDI feed with embedded audio, although any audio/video feeds provides the minimum functionality required. In still another aspect, there is LTC feed as well. In one embodiment of the collaborative delivery and display system 10, the log file 60 is compatible with Da Vinci v.1005, which is required for automated meta-data embedding and media file 50 chopping.

As stated above, the collaborative delivery and display system 10 has several minimum requirements for proper functioning. In terms of end user technical requirements, the collaborative delivery and display system 10 has minimum requirements of Windows 2000/XP or better, Internet Explorer 6.0 or better, WINDOWS Media Player 7.1 or better, and Macromedia Flash Plug-In.

The end user must also properly configure the securities setting in Internet Explorer 6.0 for optimal usage of the collaborative delivery and display system 10. Specifically, the end user should first select "Internet Options" from within the "Tools" dropdown Menu. From within the Internet Options, the end user should then select the "Security" tab. Next the end user selects the "Custom Level" button. Continuing, the end user should enable the "Download for signed ActiveX controls/Download Unsigned for Upload purposes" tab. Finally, the end user should enable the "Download ActiveX controls" tab.

In one embodiment, the end user also downloads the MICROSOFT Java Runtime application. Java Runtime is used for downloading the media files 50. Additionally, Windows XP users should download and install MICROSOFT Virtual Machine from Windows Update. Finally, an end user should install all of the latest updates for MICROSOFT XP and Internet Explorer 6.0.

The collaborative delivery and display system 10 features collaborative tools that enable content creators to communicate notes related to the production process in real time and free of the constraints of time or location. In one embodiment, the collaborative delivery and display system 10 enables multiple users, in disparate locations, to view dailies simultaneously with features that include, by way of example only, and not by way of limitation: (1) a simple user interface; (2) high quality, full-screen, full-motion video, accessible via multimedia laptops, desktops (Windows and MAC OS 10 compatible), TVs, and screening rooms; (3) editorial review and approval; (4) collaborative tools; (5) Project Bulletin Boards; (6) download and search functionality; (7) calendar functionality; (8) integrated scene/take and meta-data capabilities; (9) minimal infrastructure requirements; and (10) extensive DIGITAL RIGHTS MANAGEMENT capabilities.

Furthermore, the various methodologies described above are provided by way of illustration only and should not be construed to limit the disclosure. Those skilled in the art will readily recognize various modifications and changes may be made to the disclosure without departing from the true spirit and scope of the disclosure. Accordingly, it is not intended that the disclosure be limited, except as by the appended claims.

What is claimed is:

1. A method for delivering media content in full motion video to users via a network in a collaborative media production process, the method comprising:
   receiving production digital media files at a server;
   preparing the production digital media files for downloading or streaming to a collaborative display interface, wherein the production digital media files include meta-data captured on a production set, including SMPTE time codes;
   downloading or streaming the production digital media files to a collaborative display interface via the network; and
   enabling viewing and collaborative interaction with the production digital media files by a user using the collaborative display interface, wherein the collaborative interaction includes interacting with other users during post-production by notating comments that include inserting a link to a specific digital media file and an actual media clip frame using a production time code.

2. The method of claim 1, wherein the collaborative display interface displays available media files for viewing in multiple organizational formats including calendar indicia that organizes media files by dates on which the media files were filmed.

3. The method of claim 1, wherein the collaborative display interface displays available media files for viewing in multiple organizational formats including a media list of available digital media files.

4. The method of claim 3, wherein the media list is searchable or sortable by media file name, media file scene, and media file creation date.

5. The method of claim 3, wherein a play list of media files is creatable by a user from the media list in a play list order that is selectable by a user.

6. The method of claim 5, wherein the play list of media files is frame-by-frame enabled.

7. The method of claim 5, wherein the play list of media files comprises a play list file.

8. The method of claim 5, wherein the play list is downloaded as a file that has been secured using digital rights management encryption, and wherein the encryption is maintained after the play list is downloaded.

9. The method of claim 1, wherein digital media files are grouped within a project, and wherein the collaborative display interface includes a project bulletin board on which messages are postable by a user for viewing by other users with access to the media files in the project.

10. The method of claim 9, wherein the collaborative display interface enables messages in the project bulletin board to be replied to in Internet user group thread format with time and date stamping.

11. The method of claim 1, wherein the collaborative display interface includes a clip collaboration board on which messages that are directly related to an associated media clip are postable by a user for viewing by other users.

12. The method of claim 11, wherein messages posted on the clip collaboration board have direct relationships with a related media clip including time markers.

13. The method of claim 11, wherein time marker links are attachable to messages posted on the clip collaboration board, and wherein the time marker links, when selected, advance a currently selected media clip to an exact time marker location within the media clip, thereby enabling messages to be directly associated with an exact media clip frame.

14. The method of claim 1, wherein the collaborative display interface plays digital media files as media clips using an embedded media player.

15. The method of claim 1, wherein the collaborative display interface includes a media mark-up overlay feature that enables notation of comments or drawings over an area on a media clip frame by a user.

16. The method of claim 1, wherein the collaborative display interface includes a media access control feature that enables hierarchical control rules for collaboration and viewing access to media files to be established.

17. A method for delivering media content in full motion video to users via a network in a collaborative media production process, the method comprising:
  receiving production digital media files at a server;
  preparing the production digital media files for downloading or streaming to a collaborative display interface, wherein the meta-data file contains meta-data at least from film, video, television, or commercial production or post-production, and wherein the meta-data includes SMPTE time codes;
  downloading or streaming the production digital media files to a collaborative display interface via the network; and
  enabling viewing and collaborative interaction with the production digital media files by a user using the collaborative display interface, wherein the collaborative interaction includes interacting with other users during production and post-production by notating comments that includes inserting a link to a specific digital media file and an actual media clip frame.

18. A collaborative display interface system for a delivery and display system, wherein the collaborative display interface system includes a processor and delivers media content to users via a network, the collaborative display interface system comprising:
  a collaborative display interface for displaying downloaded or streaming production digital media files to a user as media clips, wherein the media files are associated with meta-data that was captured on a production set;
  wherein the collaborative display interface enables viewing and collaborative interaction with the production digital media files using the processor, wherein the collaborative interaction includes interacting with other users by notating comments that include inserting a link to a specific digital media file and an actual media clip frame using a production time code location, and wherein the collaborative display interface includes a media mark-up overlay feature that enables notation of comments or drawings over an area on a media clip frame by a user.

19. The system of claim 18, wherein the collaborative display interface displays available media files for viewing in multiple organizational formats including a media list of available digital media files.

20. The system of claim 19, wherein the media list is searchable or sortable by media file name, media file scene, and media file creation date.

21. The system of claim 19, wherein a play list of media files is creatable by a user from the media list in a play list order that is selectable by a user.

22. The system of claim 21, wherein the play list of media files is frame-by-frame enabled.

23. The system of claim 21, wherein the play list of media files comprises a play list file.

24. The system of claim 21, wherein the play list is downloaded as a file that has been secured using digital rights management encryption, and wherein the encryption is maintained after the play list is downloaded.

25. The system of claim 18, wherein a play list of media files is automatically created with the media files in an order from a meta-data file.

26. The system of claim 18, wherein digital media files are grouped within a project, and wherein the collaborative display interface includes a project bulletin board on which messages are postable by a user for viewing by other users with access to the media files in the project.

27. The system of claim 18, wherein the collaborative display interface includes a clip collaboration board on which messages that are directly related to an associated media clip are postable by a user for viewing by other users.

28. The system of claim 27, wherein messages posted on the clip collaboration board have direct relationships with a related media clip including time markers.

29. The system of claim 18, wherein the collaborative display interface enables media clips to be played using frame-by-frame mobility, and wherein the frame-by-frame mobility enables a user to set time marker links at exactly the frames that are desired to be marked.

30. The system of claim 18, wherein the collaborative display interface includes a media access control feature that enables hierarchical control rules for collaboration and viewing access to media files to be established.

31. A collaborative display interface system for a delivery and display system, wherein the collaborative display interface system includes a processor and delivers media content to users via a network, the collaborative display interface system comprising:
- a collaborative display interface for displaying downloaded or streaming production digital media files to a user as media clips using the processor, wherein the media files are associated with meta-data at least from film, video, television, or commercial production or post production, and wherein the meta-data includes production time codes;
- wherein the collaborative display interface enables users to collaboratively interact with other users during post-production by notating comments that are linked to a specific production digital media file and an actual media clip frame using production time codes.

32. A collaborative display interface system for a delivery and display system, wherein the collaborative display interface system includes a processor and delivers media content to users via a network, the collaborative display interface system comprising:
- a collaborative display interface for displaying downloaded or streaming production workflow digital media files to a user as media clips using the processor, wherein the media files are associated with meta-data that was captured on a production set, the meta-data including production time codes; and
- wherein the collaborative display interface enables users to collaboratively interact with other users during post-production by notating comments that are linked to a specific production digital media file and an actual media clip frame using production time codes.

* * * * *